United States Patent
Kwon et al.

(10) Patent No.: US 10,321,090 B2
(45) Date of Patent: Jun. 11, 2019

(54) TERMINAL DEVICE AND CONTROLLING METHOD THEREOF

(71) Applicant: LG ELECTRONICS INC., Seoul (KR)

(72) Inventors: Yunmi Kwon, Seoul (KR); Kiseon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 40 days.

(21) Appl. No.: 15/170,144

(22) Filed: Jun. 1, 2016

(65) Prior Publication Data

US 2017/0026610 A1 Jan. 26, 2017

(30) Foreign Application Priority Data

Jul. 20, 2015 (KR) ........................ 10-2015-0102184

(51) Int. Cl.
*H04N 1/00* (2006.01)
*H04N 5/77* (2006.01)
(Continued)

(52) U.S. Cl.
CPC .......... *H04N 5/9202* (2013.01); *G03B 31/06* (2013.01); *G11B 27/10* (2013.01);
(Continued)

(58) Field of Classification Search
None
See application file for complete search history.

(56) References Cited

U.S. PATENT DOCUMENTS

2003/0052986 A1* 3/2003 Matsumoto ........ H04N 1/00442
348/333.05
2004/0189823 A1* 9/2004 Shibutani ............. H04N 1/2112
348/231.1
(Continued)

FOREIGN PATENT DOCUMENTS

CN 1747486 A 3/2006
CN 104395903 A 3/2015
KR 1020110042856 A 4/2011

OTHER PUBLICATIONS

Boris Guenebaut: "Automatic Subtitle Generation for Sound in Videos", 2009:TAPRO 02, May 2009, pp. 1-35, XP055178994.
(Continued)

*Primary Examiner* — Twyler L Haskins
*Assistant Examiner* — Quan Pham
(74) *Attorney, Agent, or Firm* — Dentons US LLP

(57) ABSTRACT

A terminal device and controlling method thereof are disclosed, by which sound or video on taking a photo can be saved as background data. The present invention includes a camera unit configured to capture an image, a memory configured to store the captured image, an output unit configured to display the captured image, and a controller controlling the camera unit, the memory and the output unit, the controller, if a command of driving the camera unit is inputted, controlling the camera unit to run a preview, record a sound and/or shoot a video, the controller temporarily saving the sound or the video, the controller, if a $2^{nd}$ image is captured, controlling the memory to store the sound or the video in a manner of linking the sound or the video to at least one of the image or the second image.

16 Claims, 20 Drawing Sheets

(51) Int. Cl.
  *H04N 5/92* (2006.01)
  *H04N 7/18* (2006.01)
  *H04N 9/82* (2006.01)
  *G03B 31/06* (2006.01)
  *G11B 27/10* (2006.01)
  *H04M 1/725* (2006.01)
  *H04N 5/232* (2006.01)

(52) U.S. Cl.
  CPC .......... *H04M 1/72522* (2013.01); *H04N 1/00* (2013.01); *H04N 5/232* (2013.01); *H04N 5/772* (2013.01); *H04N 7/188* (2013.01); *H04N 9/8211* (2013.01); *H04M 2250/52* (2013.01)

(56) References Cited

U.S. PATENT DOCUMENTS

| | | | | |
|---|---|---|---|---|
| 2006/0045490 | A1* | 3/2006 | Ilda | H04N 5/232 386/224 |
| 2006/0080719 | A1* | 4/2006 | Minatogawa | H04N 1/00127 725/105 |
| 2006/0182436 | A1* | 8/2006 | Tabuchi | G11B 27/034 396/287 |
| 2009/0295948 | A1* | 12/2009 | Oishi | H04N 1/2166 348/239 |
| 2010/0265361 | A1* | 10/2010 | Inoue | H04N 5/232 348/231.6 |
| 2011/0102616 | A1* | 5/2011 | Migiyama | G11B 27/3027 348/222.1 |
| 2011/0193993 | A1* | 8/2011 | Yeom | H04N 5/232 348/231.3 |
| 2012/0315013 | A1 | 12/2012 | Wing et al. | |
| 2014/0078343 | A1* | 3/2014 | Dai | H04N 5/772 348/231.99 |
| 2014/0135076 | A1* | 5/2014 | Lee | H04M 1/6041 455/569.1 |
| 2014/0270689 | A1 | 9/2014 | Chau et al. | |
| 2015/0070525 | A1 | 3/2015 | Rajagopalan et al. | |
| 2015/0147048 | A1* | 5/2015 | Kim | H04N 21/4852 386/282 |
| 2016/0054895 | A1* | 2/2016 | Lee | G06F 3/04842 715/716 |

OTHER PUBLICATIONS

Eyas El-Qawasmeh: "Scene Change Detection Schemes for Video Indexing in Uncompressed Domain", Informatica, 2003, vol. 14, No. 1, 19-36, 2003 Institute of Mathematics and Informatics, Vilnius, XP008066301.

* cited by examiner

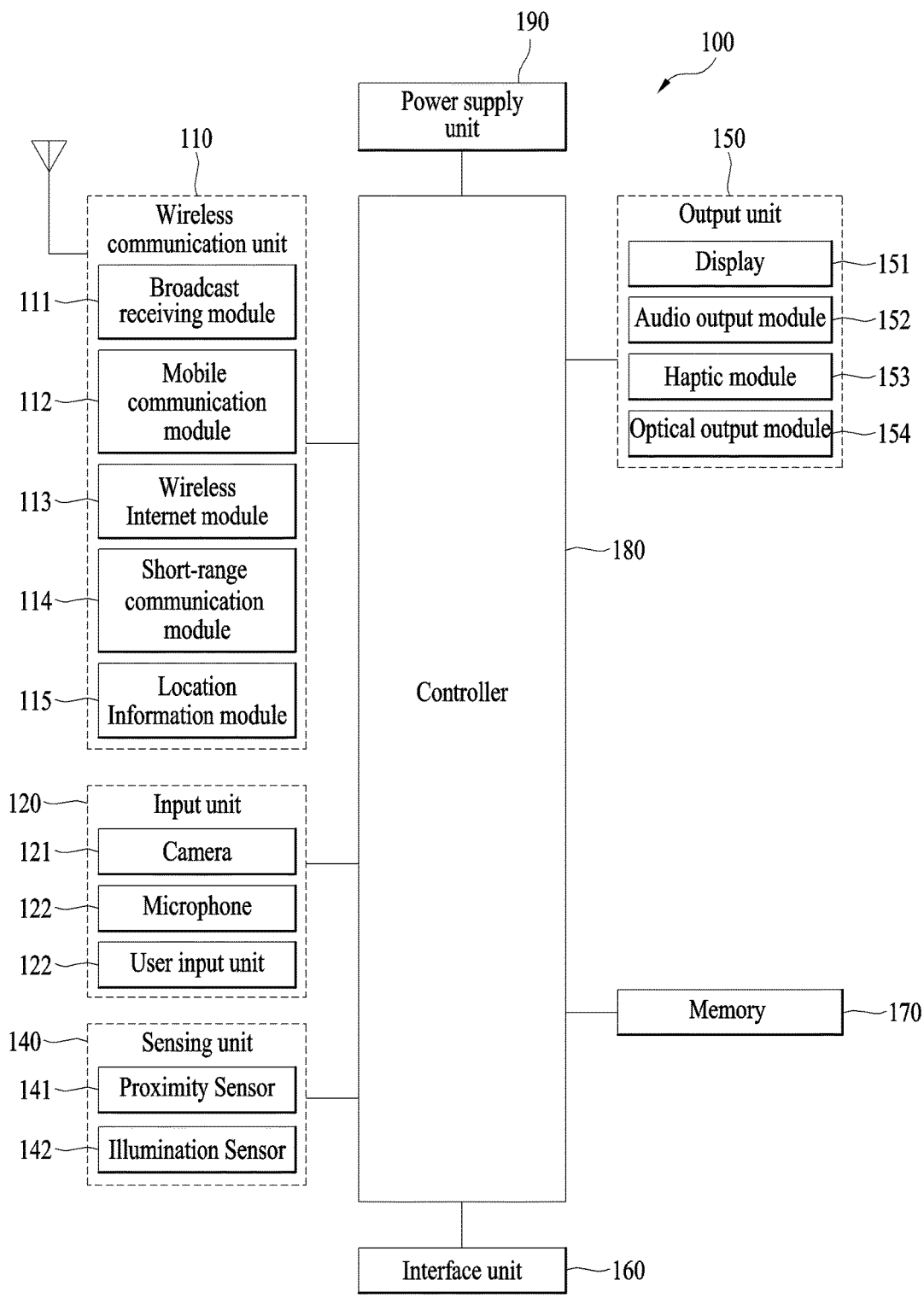

FIG. 3
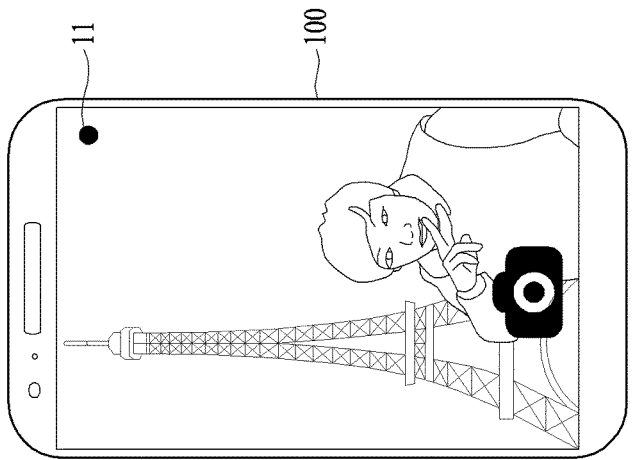
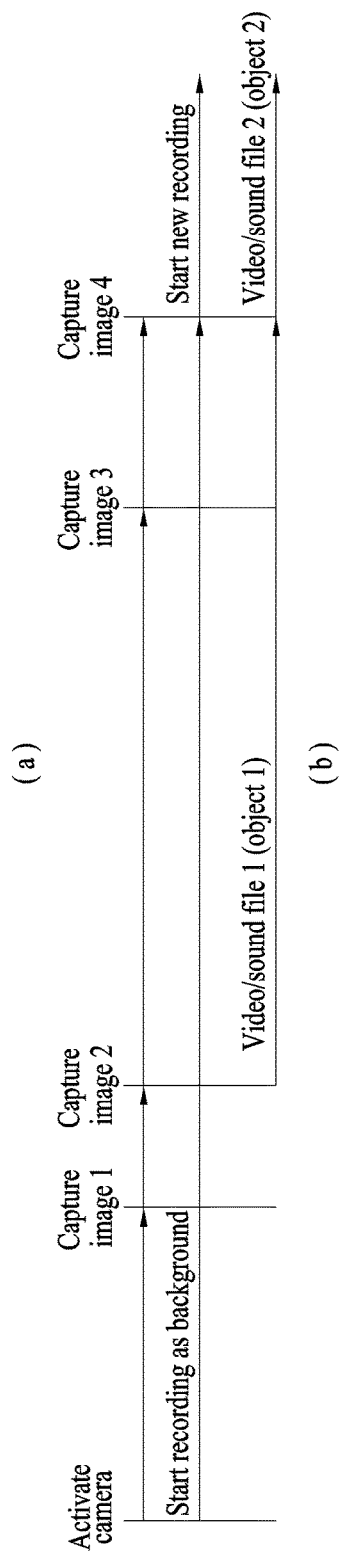

FIG. 5
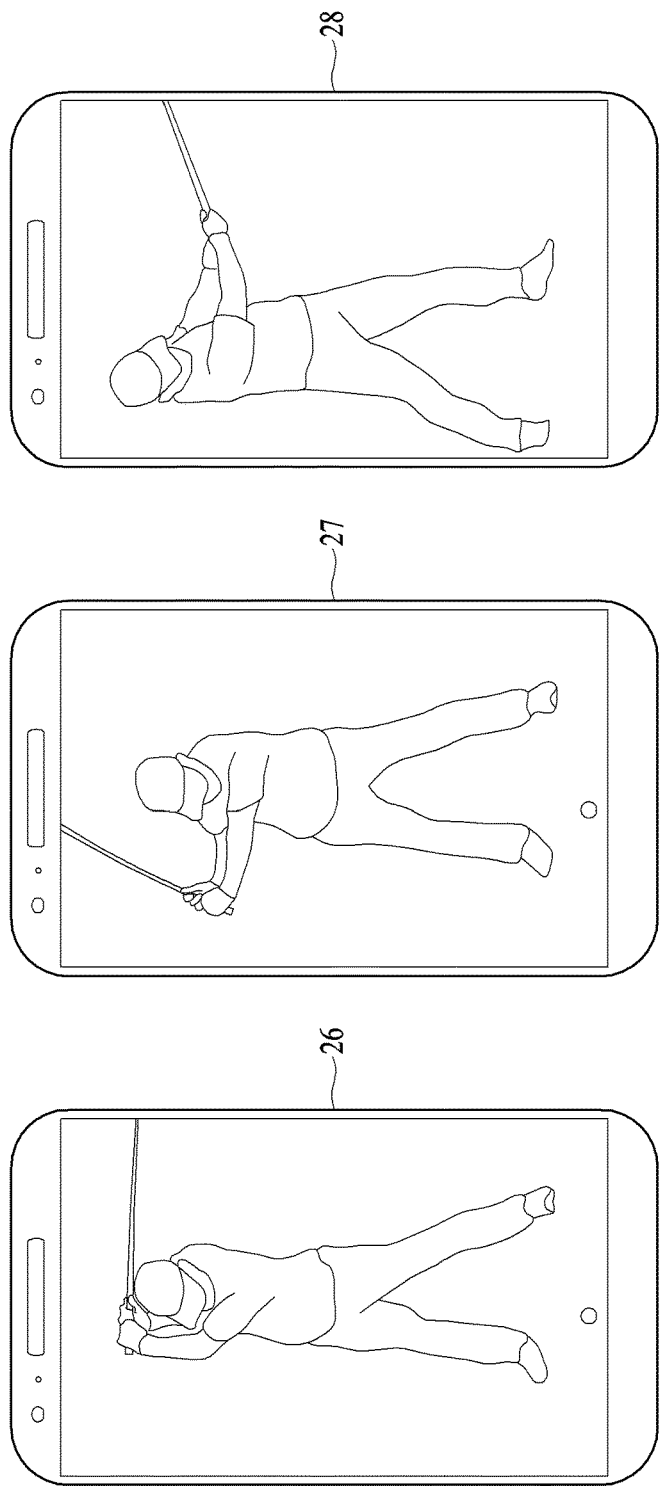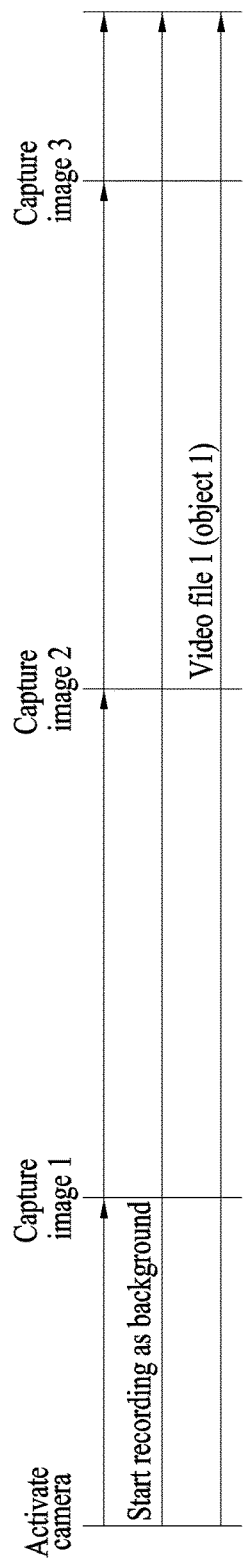

(a)            (b)

(a)  (b)

FIG. 11
(b)
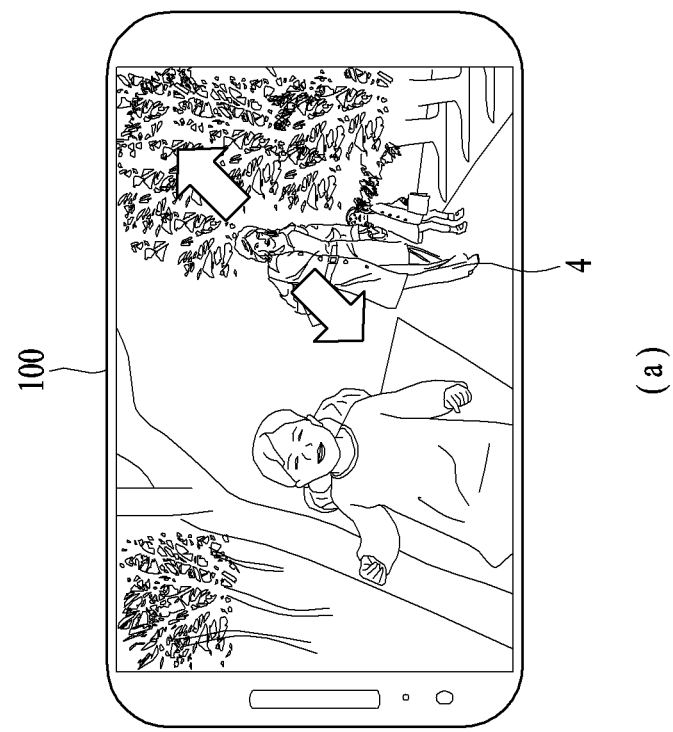
(a)

TERMINAL DEVICE AND CONTROLLING METHOD THEREOF

Pursuant to 35 U.S.C. § 119(a), this application claims the benefit of earlier filing date and right of priority to Korean Application No. 10-2015-0102184, filed on Jul. 20, 2015, the contents of which are hereby incorporated by reference herein in their entirety.

BACKGROUND OF THE INVENTION

Field of the Invention

The present invention relates to a terminal device, and more particularly, to a terminal device and controlling method thereof.

Discussion of the Related Art

Generally, terminals can be classified into mobile/portable terminals and stationary terminals. In particular, the mobile terminals can be further classified into handheld terminals and vehicle mounted terminals according to possibility of user's direct portability.

Recently, functions of a mobile terminal tend to be diversified. For instance, the diversified functions include a function of data and audio communication, a function of photographing and video-making through a camera, a function of audio recording, a function of music file play through a speaker system, a function of outputting an image or video to a display unit, and the like. A prescribed terminal is further equipped with an electronic game play function or performs a multimedia player function. Particularly, a recent mobile terminal is able to receive multicast signals for providing visual contents such as a broadcast, a video, a television program and the like.

As functions of the terminal are getting diversified, the terminal tends to be implemented as a multimedia player provided with complex functions such as photographing of photos or videos, playback of music or video files, game play, broadcast reception and the like for example.

To support and increase the terminal functions, it may be able to consider the improvement of structural parts and/or software parts of the terminal.

Meanwhile, when a user watches a photo, the user occasionally looks back upon the ambience or memory in taking the photo. However, the terminal shows the taken photo only. Thus, the demand for a technology capable of recording a situation or ambience at that time of the shooting is increasingly rising.

SUMMARY OF THE INVENTION

Accordingly, embodiments of the present invention are directed to a terminal device and controlling method thereof that substantially obviate one or more problems due to limitations and disadvantages of the related art.

An object of the present invention is to provide a terminal device and controlling method thereof, by which sound or video on taking a photo can be saved as background data.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a terminal device according to one embodiment of the present invention may include a camera unit configured to capture an image, a memory configured to store the captured image, an output unit configured to display the captured image, and a controller controlling the camera unit, the memory and the output unit, the controller, if a command of driving the camera unit is inputted, controlling the camera unit to run a preview, record a sound and/or shoot a video, the controller temporarily saving the sound or the video, the controller, if a $2^{nd}$ image is captured, controlling the memory to store the sound or the video in a manner of linking the sound or the video to at least one of the image or the second image.

Preferably, if at least one object change selected from the group consisting of an object movement over a preset rate, an object addition and an object disappearance occurs based on an object contained in a plurality of images including the $2^{nd}$ image and the images captured thereafter, the controller may control the memory to store a plurality of the captured images in a manner of linking a plurality of the captured images to the video.

Preferably, if at least one object change selected from the group consisting of an object movement over a preset rate, an object addition and an object disappearance does not occur based on an object contained in a plurality of images including the $2^{nd}$ image and the images captured thereafter, the controller may control the memory to store a plurality of the captured images in a manner of linking a plurality of the captured images to the sound.

Preferably, if an object contained in the captured image is changed from an object contained in a previous captured image, the controller may stop the recording of the sound or the shooting of the video, record a new sound or shoot a new video, and save the new sound or the new video temporarily.

Preferably, the controller may remove noise contained in the sound.

Preferably, the controller may remove a voice contained in the sound failing to match a call voice data based on a voice contained in the sound and the call voice data of a user of the terminal device.

Preferably, the controller may link an object matched to a voice based on the voice contained in the sound and the object contained in the captured image.

More preferably, when the sound linked image is displayed, if a $1^{st}$ object contained in the image is enlarged, the controller may play a part containing a $1^{st}$ voice linked to the $1^{st}$ object in the sound.

More preferably, when the sound linked image is displayed, if a part containing a $1^{st}$ voice contained in the sound is played, the controller may control the output unit to enlarge and display a $1^{st}$ object linked to the $1^{st}$ voice in the sound linked image.

Preferably, the controller may configure a plurality of images including the $2^{nd}$ image and the image captured thereafter into a single group.

Preferably, if the video linked image is selected, the controller may control the output unit to display a button for playing the video together with the video linked image.

Preferably, if the sound linked image is selected, the controller may display the sound linked image and plays the sound.

More preferably, the controller may adjust a volume of the sound by recognizing a user's voice.

Preferably, if the sound linked image is selected in vibration mode, the controller may not output the sound but may display a text of the voice contained in the sound.

More preferably, if a prescribed one of a plurality of the images is displayed and the displayed prescribed image is maintained over a preset time, the controller may play a plurality of the images as a slide show.

And, the controller may adjusts a play time interval of the slide show in consideration of at least one of a presence or non-presence of the sound, a presence or non-presence of an object movement over a preset rate, and shot intervals among a plurality of the images.

More preferably, if a last image included in the single group is displayed, the controller may control the output unit to display a menu for selecting at least one different group including an object contained in common in a plurality of the images included in the single group.

More preferably, when a plurality of the images are displayed as thumbnails, if a start image and an end image is selected from the single group, the controller may play a plurality of images ranging from the start image to the end image as a slide show.

Preferably, if the sound or video linked image is deleted, the controller may control the output unit to display a menu for checking whether the sound or video linked to the deleted image is deleted.

Preferably, the controller may control the memory to store the sound in a manner of linking the sound to the image captured thereafter by including the $2^{nd}$ image.

Preferably, the controller may control the memory to store the video in a manner of linking the video to the image captured thereafter by including the $2^{nd}$ image.

In another aspect of the present invention, as embodied and broadly described herein, a method of controlling a terminal device according to another embodiment of the present invention may include the steps of if a command of driving the camera unit is inputted, running a preview, recording a sound and/or shooting a video, temporarily saving the sound or the video, capturing a $1^{st}$ image, and if a $2^{nd}$ image is captured, saving the sound or the video in a manner of linking the sound or the video to at least one of the $1^{st}$ image or the $2^{nd}$ image.

Accordingly, embodiments of the present invention provide various effects and/or features.

According to at least one of embodiments of the present invention, a real-time recorded sound or video can be synchronously linked to a corresponding photo shooting.

According to at least one of embodiments of the present invention, a voice in sound can be matched to a person in a photo.

According to at least one of embodiments of the present invention, a user can hear a recorded sound on watching a photo.

Effects obtainable from the present invention may be non-limited by the above mentioned effect. And, other unmentioned effects can be clearly understood from the following description by those having ordinary skill in the technical field to which the present invention pertains. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 1A is a diagram to describe a mobile terminal device related to the present invention;

FIG. 3 is a diagram to describe a process for recording a background sound or shooting a background video according to one embodiment of the present invention;

FIG. 5 is a diagram to describe a photo linked to a video according to one embodiment of the present invention;

FIG. 11 is a diagram to describe one embodiment of outputting a voice matched to an object in a photo;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
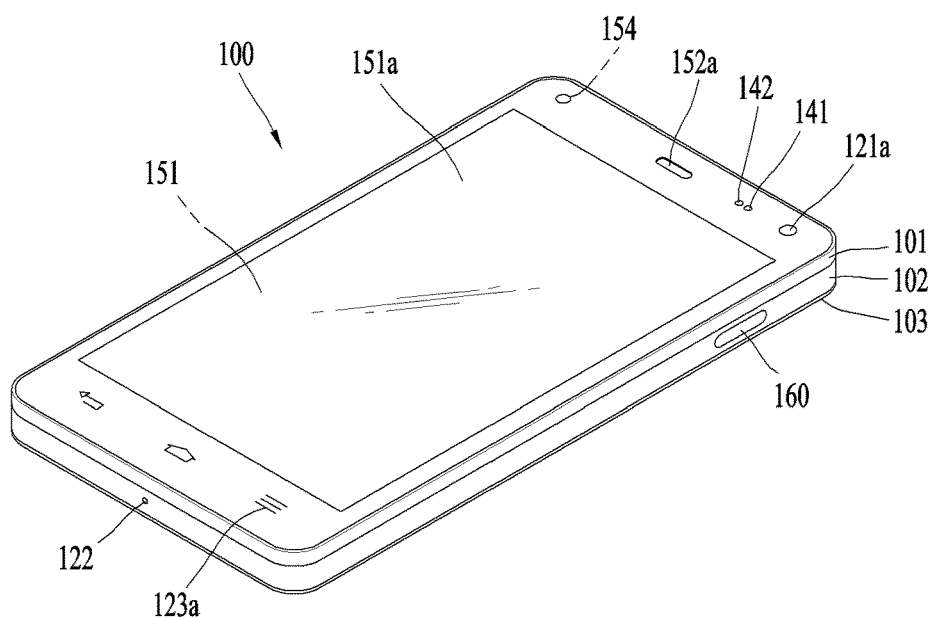
FIG. 1B and FIG. 1C are diagrams for the concept of one example of mobile terminal device related to the present invention in different views, respectively.
Figure 1C:
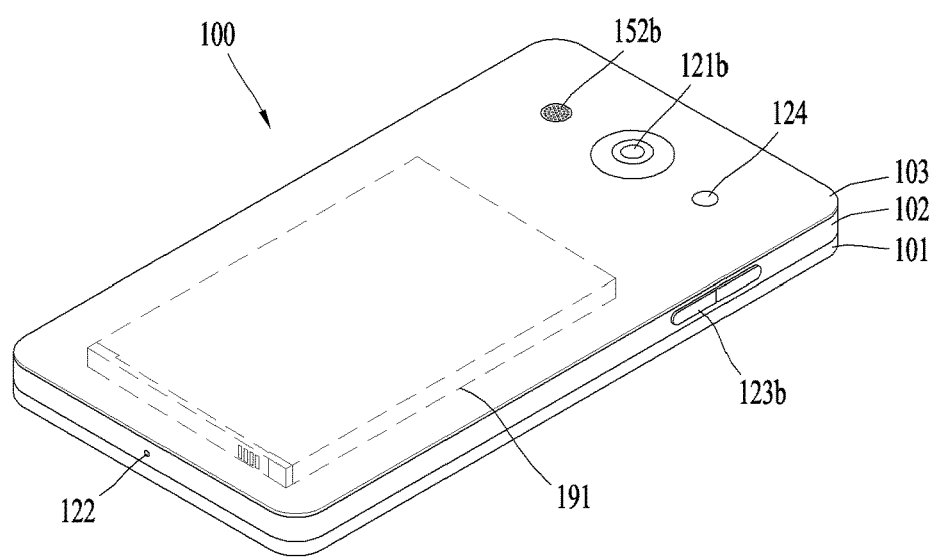

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can process or provide appropriate information or function to a user by processing signals, data, information and the like inputted or outputted through the above-mentioned components or running application programs saved in the memory 170.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the above-mentioned components can cooperatively operate to embody operations, controls or controlling methods of the mobile terminal according to various embodiments mentioned in the following description. And, the operations, controls or controlling methods of the mobile terminal can be embodied on the mobile terminal by running at least one or more application programs saved in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or bath. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that its input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile ten final 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal.

In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be provided with the display unit 151, the first audio output unit 152a, the second audio output unit 152b, the proximity sensor 141, the illumination sensor 142, the light output unit 154, the first camera 121a, the second camera 121b, the first manipulating unit 123a, the second manipulating unit 123b, the microphone 122, the interface unit 160, and the like.

FIGS. 1B and 1C depict certain components as arranged on the mobile terminal.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can the use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160.

Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Further preferred embodiments will be described in more detail with reference to additional drawing figures. It is understood by those skilled in the art that the present features can be embodied in several forms without departing from the characteristics thereof.

Figure 2:
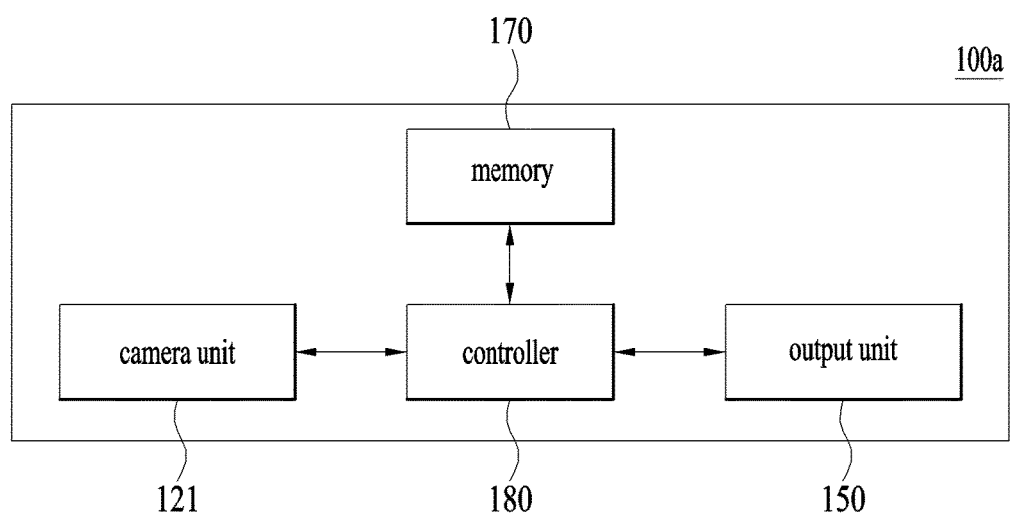
FIG. 2 is a block diagram of a terminal device according to one embodiment of the present invention.

FIG. 2 is a block diagram of a terminal device according to one embodiment of the present invention.

Referring to FIG. 2, a terminal device 100a may include a camera unit 121, an output unit 150, a memory 170 and a controller 180.

The camera unit 121 can capture an image. The memory 170 can store the captured image. In particular, the memory 170 can include a min memory configured to store and keep the captured image and a buffer configured to temporarily keep the captured image.

If a command of driving the camera unit is inputted, the controller 180 can run a preview. In this case, the preview may mean a state that an external image inputted through a lens of the turned-on camera unit 121 and that the inputted external image is outputted through the output unit 150. As soon as the preview is run, the controller 180 can shoot a background video or record a background sound. In this case, the background video may mean a video to be linked to a background of an image captured by a user. And, the background sound may mean a sound to be linked to the image captured by the user. The background video may contain a sound. The background video starts to be shot if the camera unit 121 is turned on. And, the shot video can be saved in a temporary memory such as a buffer or the like. In some cases, the background video may be temporarily saved in a prescribed region of the main memory. Yet, if a linked captured image does not exist, the background video can be deleted. Moreover the sound is extracted from the background video only and can be then saved in a manner of being linked to the captured image. Alternatively, after a background sound has been recorded only, it can be saved in a manner of being linked to the captured image.

While the preview is run, if a $2^{nd}$ image is captured, a background video temporarily saved in the $2^{nd}$ image or a sound in the background video can be saved together with the image in a manner of being linked to the captured $2^{nd}$ image. In some cases, while the background video is shot, if the $2^{nd}$ image is captured, the controller 180 can display a bookmark at a timing point of capturing the image in the background video. Subsequently, if a $3^{rd}$ image is captured, the controller 180 can display a bookmark at a timing point of capturing the $3^{rd}$ image in the same manner. As the shooting is ended, if the camera unit 121 is turned off, the controller 180 can control the captured image to be saved in a manner of being linked to the background video or the background sound. If an object in the captured image is changed, the controller 180 stops the recording of the background sound or the shooting of the background video and is then able to record a new background sound or shoot a new background video.

The output unit 150 may include a display unit and an audio output unit. Hence, the output unit 150 can output a background sound or play a background video. And, the output unit 150 can output a captured image.

One embodiment of the present invention is described in detail as follows.

FIG. 3 is a diagram to describe a process for recording a background sound or shooting a background video according to one embodiment of the present invention.

Referring to FIG. 3 (a), a terminal device 100 configured to capture an image is illustrated. A user can run a camera function to photograph an object. If the camera function is run, the terminal device 100 may record a background sound or shoot a background video. The terminal device 100 may display an audio/video recording mark 11 indicating the audio recording of the background sound or the video shooting of the background video. When the terminal device 100 records the background sound, the audio/video recording mark 11 can be displayed as an image related to sound. When the terminal device 100 shoots the background video, the audio/video recording mark 11 can be displayed as an image related to video. If a user selects the audio/video recording mark 11, the terminal device 100 may stop the recording or the shooting. If the terminal device 100 stops the recording of the background sound or the shooting of the background video, the terminal device 100 can capture a general image.

The terminal device 100 can save a background sound or a background video in such a temporary memory as a buffer, a cache memory, or the like. In some cases, if a storage capacity of the temporary memory is insufficient, the terminal device 100 may use the main memory. If a user does not take a photo or ends the camera function after taking a single photo only, the terminal device 100 may delete the temporarily saved background sound or video. In case that the user takes at least two photos, the terminal device 100 may save the taken photos in a manner of linking the taken photos to the background video or the background sound. An embodiment of linking the background video and the taken photo together and an embodiment of linking the background sound and the taken photo together are described in detail as follows.

Referring to FIG. 3 (b), a time table for describing an embodiment of linking a background video or a background sound to a taken photo is illustrated. As mentioned in the foregoing description, if a camera function is run, the terminal device 100 can shoot a background video containing a background sound. And, the terminal device 100 may record the background sound only. A user can capture a $1^{st}$ image. The terminal device 100 saves the captured $1^{st}$ image and is able to maintain the shooting of the background video or the recording of the background sound. The user can capture a $2^{nd}$ image by maintaining a preview. The terminal device 100 can continue to keep the shooting of the background video or the recording of the background sound. If the terminal device 100 determines that the $2^{nd}$ image is associated with the $1^{st}$ image temporally and spatially, the terminal device 100 can link the captured $2^{nd}$ image to the background video or the background sound. The terminal device 100 can control the aforementioned audio/video recording mark 11 to be displayed by starting from a timing point of capturing the $2^{nd}$ image. In this case, if images are temporally associated with each other, it may mean that an object is consecutively captured in a predetermined time in a state that burst shot or preview is maintained.

The user may capture a $3^{rd}$ image. The shooting of the background video or the recording of the background sound can continue to be maintained. If the terminal device 100 determines that the $3^{rd}$ image and the $2^{nd}$ image are associated with each other temporally and spatially, the terminal device 100 can link the captured $3^{rd}$ image to the background video or the background sound. In particular, the terminal device 100 can capture a plurality of images associated with each other temporally and spatially in the course of shooting the background video or recording the background video. The captured image is temporally and spatially associated with another image captured next/previous to the captured image and can be also associated with the shot background video or the recorded background sound temporally and spatially. The link may mean that a captured image is connected to a background video or sound corresponding to a timing point of capturing a corresponding image. When the captured image is watched, the terminal device 100 can provide a user with the connected background video or the connected background sound. The terminal device 100 may provide the user with the connected background video or sound that starts with a $1^{st}$ part of the connected background video or sound. The terminal device 100 may provide a user with a background video or sound that starts with a part of the background video or sound corresponding to a timing point of capturing a displayed image. The terminal device 100 may provide a user with a background video or sound that starts with a preset part of the background video or sound. For instance, the preset part may be set to a part behind 10 seconds from a timing point of capturing a displayed image or a part right after capturing a previous image. The terminal device 100 can manage the temporally and spatially associated images as a single group by linking a background video or sound to a plurality of captured images. And, the terminal device 100 may provide a stereoscopic content in a manner of providing a user with a sound or video at the timing of recording a sound or shooting a video as well as with a captured image.

The user may capture a $4^{th}$ image. In this case, the $4^{th}$ image may contain an object different from that of a previous image. The terminal device 100 may determine that the $4^{th}$ image and the $3^{rd}$ image are associated with each other temporally and spatially. Yet, the $4^{th}$ image contains the different object without containing the object of the previous image. Hence, the terminal device 100 stops the shooting of the background video and may start a shooting of a new background video. In particular, if all existing objects contained in an image are changed, the terminal device 100 may shoot a new background video or may record a new background sound. As a plurality of images are temporally and spatially associated with each other, if a plurality of the images contain the same object, a plurality of the images can be sorted into a single group. Yet, if a plurality of images are not associated with each other temporally and spatially or contain different objects, a plurality of the images may be preferably classified into different groups, respectively. Hence, if one object contained in a currently captured image is changed from another object contained in a previously captured image, the terminal device 100 stops shooting a background video, shoots a new background video, and then saves the new background video temporarily, for example. And, the terminal device 100 can configure a plurality of images containing the same object into a single group.

Figure 4:
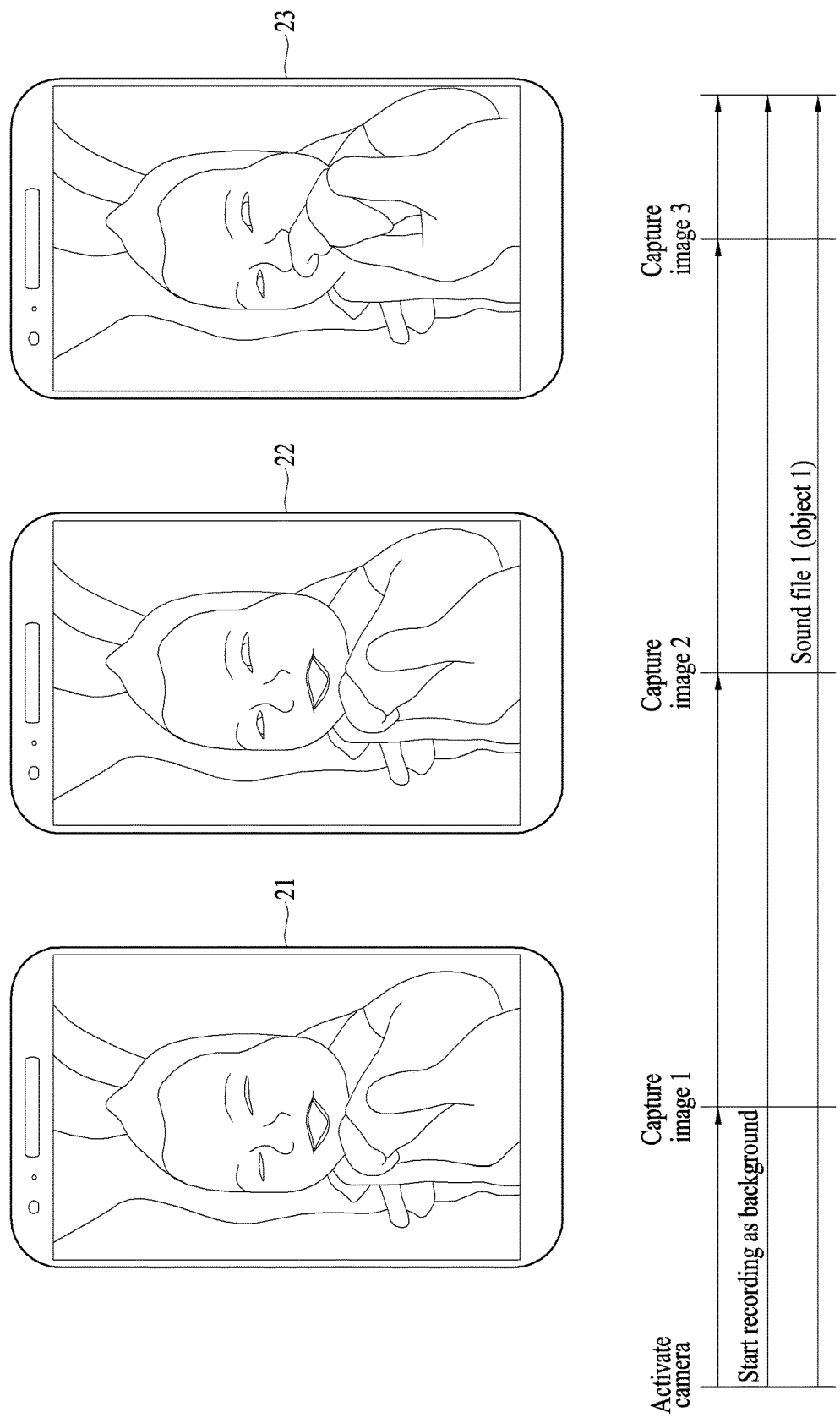
FIG. 4 is a diagram to describe a photo linked to a sound according to one embodiment of the present invention.

FIG. 4 is a diagram to describe a photo linked to a sound according to one embodiment of the present invention.

Referring to FIG. 4, an image saved in a manner of being linked to a background sound is illustrated. As mentioned in the foregoing description, a captured image can be saved in a manner of being linked to a background video or a background sound. If object changes such as an object movement over a preset rate, an object addition and an object disappearance do not occur based on an object contained in a plurality of images including a $2^{nd}$ image and an image captured behind the $2^{nd}$ image, a terminal device can save the captured image in a manner that the captured image is linked to a background sound.

If the terminal device runs a camera function, it is able to start a shooting of a background video. In this case, the background video may include a background sound. A user can capture a $1^{st}$ image 21. The terminal device can continue to keep the shooting of the background video. The user can capture a $2^{nd}$ image 22. The terminal device can compare an object of the captured $2^{nd}$ image 22 to an object of the $1^{st}$ image 21 captured right before the $1^{st}$ image 21. And, the terminal device can compare a movement of an object in an image. If there is no change of an object and there is a small movement of an object, the terminal device can save a background sound in a manner of linking the background sound to the $2^{nd}$ image 22. For instance, if a same object is contained in an image, the terminal device can determine that there is no change of object. Although the same object is contained, if all objects are not same, the terminal device may determine that a change of object has occurred.

If a movement rate of an arm or leg of an object is smaller than 30%, the terminal device can determine that a movement of object is small. If a movement rate of an object body is smaller than 10%, the terminal device can determine that a movement of object is small. If a movement of an object is small, the terminal device can save a corresponding image in a manner of linking the image to a background sound. If a movement of object is large, the terminal device can save a corresponding image in a manner of linking the image to a background video. One embodiment of linking an image to a background video shall be described later. The above-described references are just exemplary and a reference for a movement of an object can be set in various ways.

Once the terminal device determines to link the background sound to the captured image, the terminal device can save images, which will be captured by being associated with the captured image temporally and spatially, in a manner that the associated images are consecutively linked to the background sound.

By comparing a current captured image to an image captured right before the current captured image, the terminal can determine whether to link the current captured image to the background sound. The user can capture a $3^{rd}$ image 23. The terminal device can compare a movement of the captured $3^{rd}$ image 23 to that of the $2^{nd}$ image 22 captured right before the $3^{rd}$ image 23. If there is no change of object and there is a small movement of object, the terminal device can save the background sound in a manner of linking the background sound to the $3^{rd}$ image 23.

If an image is captured, the terminal device can mark a part in a background video corresponding to a timing point of capturing the image with a bookmark. The terminal device captures a plurality of images and is able to turn off a camera function. If the terminal device ends the capturing of a plurality of images sorted into a single group, the terminal device can determine whether to maintain an object among a plurality of images and can also determine a movement of the object. If the object in a plurality of the images is maintained and the movement of the object is smaller than a preset size, the terminal device can save a background sound in a manner of linking the background sound to a plurality of the images. A play timing point of the background sound having a plurality of the images linked thereto is a point of a bookmark marked at the timing point of the capturing.

Meanwhile, once the $2^{nd}$ image 22 is captured, the terminal device 100 can save the background sound ranging from a timing point of starting the camera function to a timing point of ending the camera function. Moreover, if the $2^{nd}$ image 22 is captured, the terminal device 100 can save the background sound ranging from the background sound at the timing point of starting the camera function to a timing point of capturing an image determined as a separate group.

FIG. 5 is a diagram to describe a photo linked to a video according to one embodiment of the present invention.

Referring to FIG. 5, an image saved by being linked to a background video is illustrated. If at least one object change of an object movement over a preset rate, an object addition and an object disappearance occurs based on an object contained in a plurality of images including a $2^{nd}$ image and an image captured behind the $2^{nd}$ image, a terminal device can save a plurality of the captured images in a manner of linking a plurality of the captured images to a video containing a sound.

If the terminal device runs a camera function, it is able to start a shooting of a background video. A user can capture a $1^{st}$ image 26. The terminal device can continue to keep the shooting of the background video. The user can capture a $2^{nd}$ image 27. The terminal device can compare an object of the captured $2^{nd}$ image 27 to an object of the $1^{st}$ image 26 captured right before the $1^{st}$ image 26. And, the terminal device can compare a movement of an object in an image. If there is no change of an object and there is a large movement of an object, the terminal device can save a background video in a manner of linking the background video to the $2^{nd}$ image 27. For instance, if a movement rate of an arm or leg of an object is equal to or greater than 50%, the terminal device can determine that a movement of object is large. If a movement rate of an object body is equal to or greater than 20%, the terminal device can determine that a movement of object is large. If a movement of an object is large, the terminal device can save a corresponding image in a manner of linking the image to a background video.

Once the terminal device determines to link the background video to the captured image, the terminal device can save images, which will be captured thereafter by being associated with the captured image temporally and spatially, in a manner that the associated images are consecutively linked to the background video.

By comparing a current captured image to an image captured right before the current captured image, the terminal can determine whether to link the current captured image to the background video. The user can capture a $3^{rd}$ image 28. The terminal device can compare a movement of the captured $3^{rd}$ image 28 to that of the $2^{nd}$ image 27 captured right before the $3^{rd}$ image 28. If there is no change of object and there is a large movement of object, the terminal device can save the background video in a manner of linking the background video to the $3^{rd}$ image 28.

If an image is captured, the terminal device can mark a part in a background video corresponding to a timing point of capturing the image with a bookmark. The terminal device captures a plurality of images and is able to turn off a camera function. If the terminal device ends the capturing of a plurality of images sorted into a single group, the terminal device can determine whether to maintain an object among a plurality of images and can also determine a movement of the object. If the object in a plurality of the images is maintained and the movement of the object is larger than a preset size, the terminal device can save a background video in a manner of linking the background video to a plurality of the images. A play timing point of the background video having a plurality of the images linked thereto is a point of a bookmark marked at the timing point of the capturing.

Meanwhile, once the $2^{nd}$ image 27 is captured, the terminal device 100 can save the background video ranging from a timing point of starting the camera function to a timing point of ending the camera function. Moreover, if the $2^{nd}$ image 27 is captured, the terminal device 100 can save the background video ranging from the background video at the timing point of starting the camera function to a timing point of capturing an image determined as a separate group.

Figure 6:
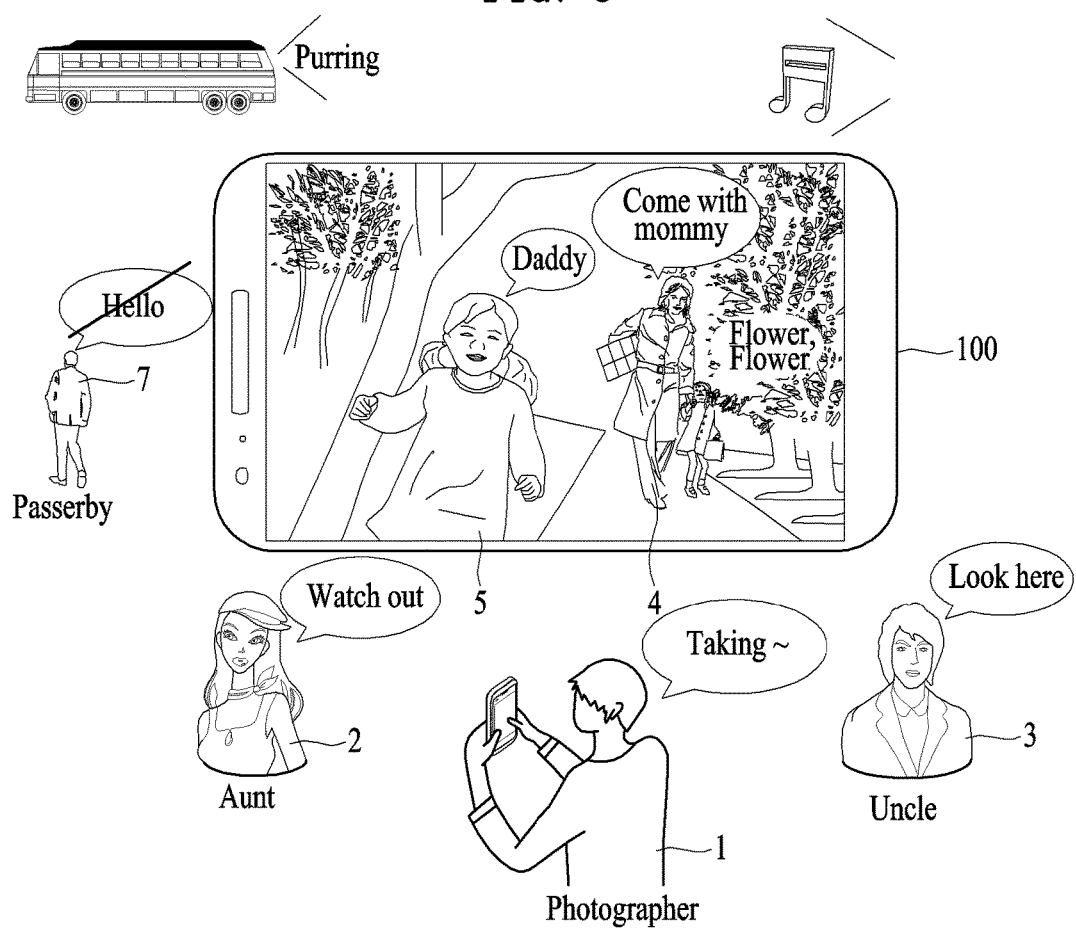
FIG. 6 is a diagram to describe one example of processing an ambient sound generated on taking a photo according to one embodiment of the present invention.

FIG. 6 is a diagram to describe one example of processing an ambient sound generated on taking a photo according to one embodiment of the present invention.

Referring to FIG. 6, an embodiment of shooting a background video by recording various sounds is illustrated. As mentioned in the foregoing description, if a camera function is run, the terminal device 100 shoots a background video and is able to temporarily save the background video. In this case, the background video may contain a background sound. And, the background sound may include various sounds. According to one embodiment, as shown in FIG. 6, the background sound may contain a voice of a photographer 1. And, the background may contain voices of persons related to the photographer 1. And, the persons may include an aunt 2, an uncle 3 and the like. The background sound may include a voice of a $1^{st}$ object 4 and a voice of a $2^{nd}$ object 5. The background sound may include a voice of a passerby 7 unrelated to the photographer 1. And, the background sound may include a bird sound, a bus sound, a music sound and the like.

The terminal device 100 can record the voice of the photographer 1. In doing so, the terminal device 100 can save the voice of the photographer 1 in a manner of adjusting a tone to match to that of another voice. The terminal device 100 can remove noise except the voices. The terminal device 100 can remove all sounds except voices. The terminal device 100 may record such a sound as a music sound and the like but may remove such a general noise as a bus sound and the like.

Meanwhile, the terminal device 100 can determine whether an ambient voice is a voice of a person related to the photographer 1. For instance, the photographer 1 may be an owner of the terminal device 100 and may have at least one experience of making a phone call to the related person. The terminal device 100 may analyze a voice of a call counterpart and have voice information. The terminal device 100 may store contacts or personal informations. Hence, the terminal device 100 can recognize an inputted voice using the voice information of the person related to the photographer 1 and the personal information of the person related to the photographer 1.

Referring to FIG. 6, the terminal device 100 can receive inputs of the voices of the photographer 1, the aunt 2, the uncle 3 and the passerby 7. The terminal device 100 can recognize the voice of the photographer 1 who is the owner of the terminal device 100. The terminal device 100 can recognize the voices of the aunt 2 and the uncle 3 related to the photographer 1 and is also able to recognize the voices of the $1^{st}$ and $2^{nd}$ objects 4 and 5 belonging to the family of the photographer 1. Yet, the terminal device 100 can recognize the voice of the passerby 7 as 'unknown'. The terminal device 100 stores a voice of a related person and removes a voice of an unrelated person, in response to a user's selection. In particular, based on the voices contained in the background sound and the voice data of the owner of the terminal device 100, the terminal device 100 can remove the voices failing to match the call voice data from the background sound.

The terminal device 100 can recognize a face of a related person using a previously taken photo, a saved personal information and/or the like. Hence, the terminal device 100 can match the $1^{st}$ object 4 in the taken photo to the voice. And, the terminal device 100 can match the $2^{nd}$ object 2 in the taken photo to the voice. In particular, the terminal device 100 cam link a voice to a matched object based on voices contained in the background sound and objects contained in a captured image.

Figure 7:
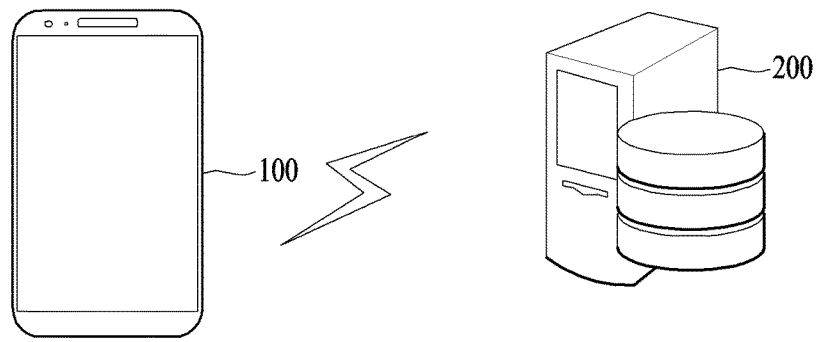
FIG. 7 is a diagram to describe a sound matching using a server according to one embodiment of the present invention.

FIG. 7 is a diagram to describe a sound matching using a server according to one embodiment of the present invention.

Referring to FIG. 7, a terminal device 100 and a server 200 are illustrated. As mentioned in the foregoing description, when a background video is shot, the terminal device 100 recognizes an ambient voice and is then able to match the recognized voice to an object in a captured image. In doing so, the terminal device 100 can use the server 200. In particular, the terminal device 100 can send data such as a saved image, a contact information, a personal information, a call voice information and the like to the server 200. The server 200 creates a user profile for each person and is able to store the data received from the terminal device 100. The server 200 can recognize a human voice based on the contact information, the call voice information and/or the like. And, the server can recognize a person based on an image. Meanwhile, the terminal device 100 can send a captured image, a background video, a background sound and the like to the server 200. Based on an existing information and the data received from the terminal device 100, the server 200 determines a human voice and is able to recognize an object in an image. The server 200 can send the detected information to the terminal device 100. Hence, the terminal device 100 can recognize a voice in a background sound and is able to match the voice to the object in the captured image.

Figure 8:
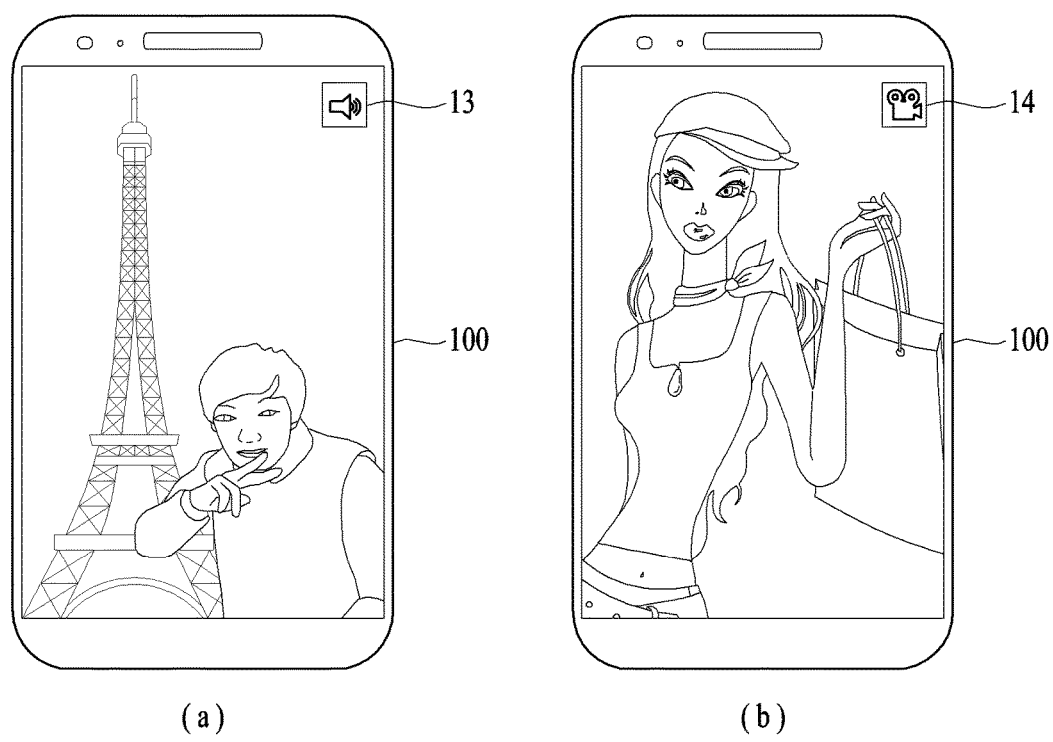
FIG. 8 is a diagram to describe a taken photo having a sound or video linked thereto according to one embodiment of the present invention.

FIG. 8 is a diagram to describe a taken photo having a sound or video linked thereto according to one embodiment of the present invention.

Referring to FIG. 8 (a), an image having a background sound linked thereto is illustrated. By the method mentioned in the foregoing description, the terminal device 100 captures an image and is then able to save the captured image in a manner of linking a background sound or a background video to the captured image. When the background sound linked image is displayed, the terminal device 100 can display a mark 13 indicating that the background sound is linked thereto. If the background sound link mark 13 is selected, the terminal device 100 can play the linked background sound. If the image having the background sound linked thereto is selected, the terminal device 100 displays the background sound link mark 13 together with the image and is able to play the background sound automatically.

Meanwhile, a background video or a background sound can be displayed as a separate file. For instance, the background video may be displayed as a separate file in a gallery. And, the background sound may be displayed as a separate file in a sound folder.

Referring to FIG. 8 (b), an image having a background video linked thereto is illustrated. The terminal device 100 captures an image and is then able to save the captured image in a manner of linking a background video to the captured image. When the background video linked image is displayed, the terminal device 100 can display a mark 14 indicating that the background video is linked thereto. If the background video link mark 14 is selected, the terminal device 100 can play the linked background video.

Meanwhile, the background sound can be simultaneously played as soon as the selected image is displayed. Yet, it is unable to simultaneously play both of the background video and the selected image. Hence, if the background video link mark 14 (or a button) is selected, the terminal device 100 can play the background video instead of the image.

Meanwhile, a background sound can be played by a different method.

Figure 9:
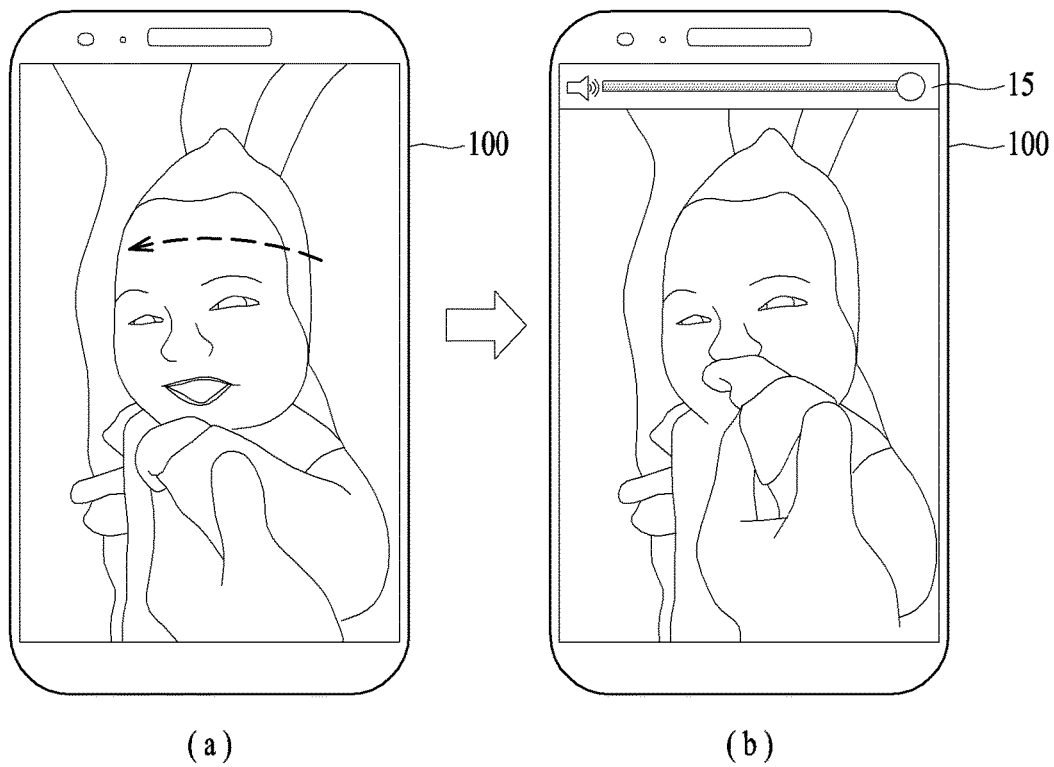
FIG. 9 is a diagram to describe a process for playing a sound linked to a photo according to one embodiment of the present invention.

FIG. 9 is a diagram to describe a process for playing a sound linked to a photo according to one embodiment of the present invention.

Referring to FIG. 9 (*a*), an image having a background sound linked thereto is illustrated. As mentioned in the foregoing description, the terminal device 100 can save temporally and spatially related images in a manner of linking the images to a recorded background sound by starting with a $2^{nd}$ image. Hence, the terminal device 100 can provide the linked background sound from the temporally and spatially related $2^{nd}$ image. On the other hand, the terminal device 100 can save temporally and spatially related images in a manner of linking the images to a recorded background sound or video by starting with a temporally and spatially related $1^{st}$ image. In particular, the terminal device 100 can save the images in a manner of linking the images to a background sound since a $1^{st}$ image is captured. If a $2^{nd}$ image is captured, the terminal device 100 can determine whether the $1^{st}$ image and the $2^{nd}$ image are related to each other. If the terminal device 100 determines that the $1^{st}$ image and the $2^{nd}$ image are related to each other, when the $2^{nd}$ image is saved by being linked to the background sound, the terminal device 100 can also save the $1^{st}$ image in a manner of linking the $1^{st}$ image to the background sound. Likewise, the terminal device 100 can link a background video to a captured image by the same method. Meanwhile, the terminal device 100 can display a background sound link mark on an image having a background sound linked thereto among images contained in a gallery and is also able to display a background video link mark on a background video linked image [mentioned in the later description]. The terminal device 100 can display a background sound link mark or a background video link mark by starting with a temporally and spatially related $2^{nd}$ image. In some cases, the terminal device 100 may display a background sound link mark or a background video link mark by starting with a temporally and spatially related $1^{st}$ image. The terminal device 100 can manage a plurality of temporally and spatially related images as a single group. Hence, when a captured image is displayed as a thumbnail, the terminal device 100 can adjacently dispose a plurality of the images managed as the single group. When the captured images are displayed one by one, the terminal device 100 can dispose a plurality of the images managed as the single group sequentially and adjacently.

The terminal device 100 can display a $1^{st}$ image among a plurality of the images managed as the single group. The terminal device 100 can display a $2^{nd}$ image in response to an input of a user's flicking gesture.

Referring to FIG. 9 (*b*), a $2^{nd}$ image managed as a single group is illustrated. When the $2^{nd}$ image is displayed, the terminal device 100 can automatically play a linked background sound. A user listens to the automatically played background sound, thereby being able to remind himself of a memory of the corresponding shooting and to indulge in reminisce.

Meanwhile, the terminal device 100 can display an adjust bar 15 together while playing a background sound. A user can adjust a volume of the background sound using the volume adjust bar 15. The terminal device 100 can display a background sound play pause button as well. If the pause is selected, the terminal device 100 pauses the play of the background sound but may display an image only.

According to the example shown in FIG. 9, when the terminal device 100 displays a $2^{nd}$ image, a background sound is automatically played. Yet, in accordance with a setting, the terminal device 100 may automatically play the background sound when displaying a $3^{rd}$ or $4^{th}$ image. The terminal device 100 may not automatically play a background sound. Instead, before the background sound is played, the terminal device 100 may display a popup window for querying whether to play the background sound. In response to a user's selection, the terminal device 100 can play the background sound.

Figure 10:
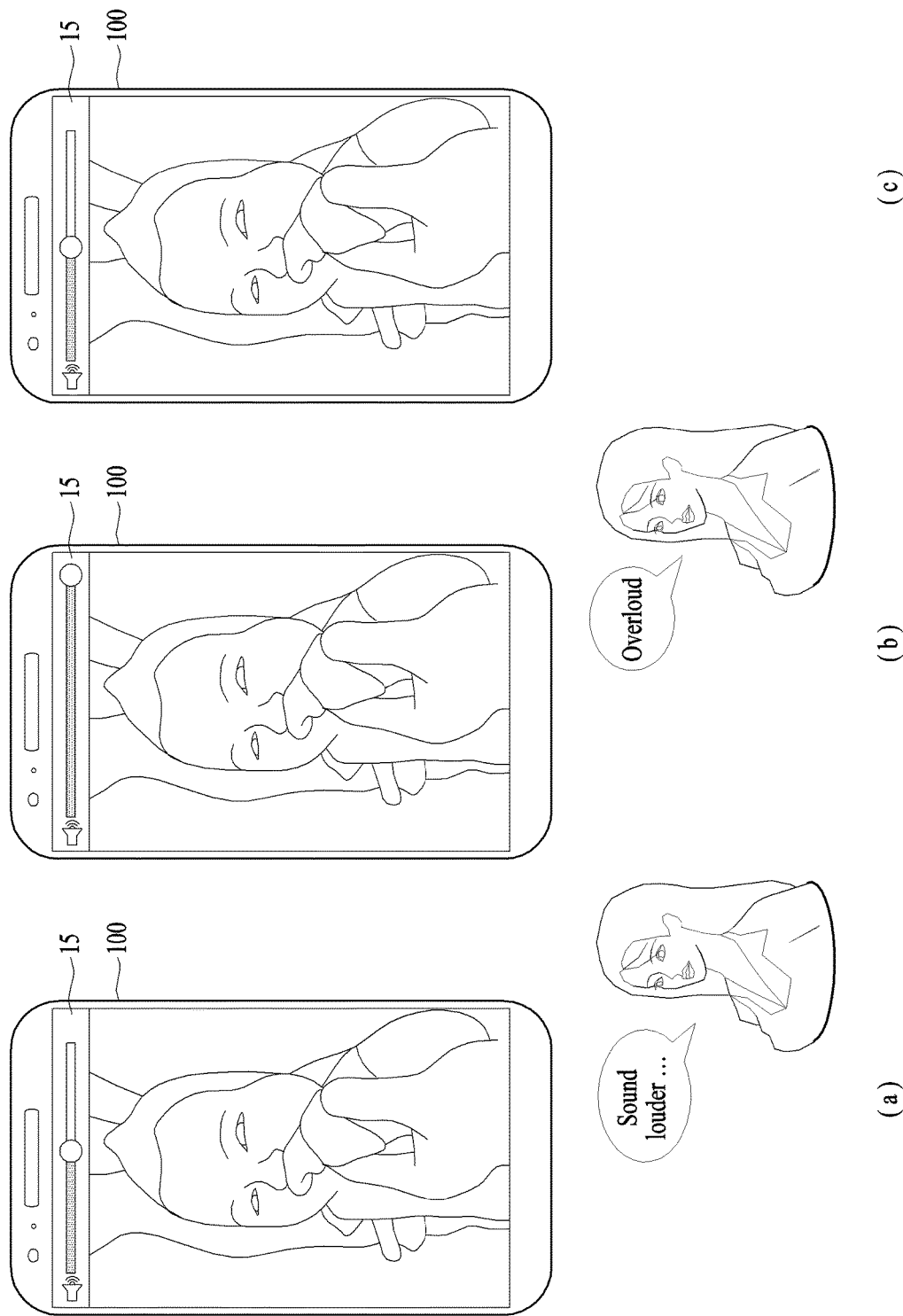
FIG. 10 is a diagram to describe one embodiment of adjusting a volume.

FIG. 10 is a diagram to describe one embodiment of adjusting a volume.

Referring to FIG. 10 (*a*), a terminal device 100 currently playing both an image and a background sound is illustrated. The terminal device 100 can display a volume bar 15 for adjusting a volume. And, a user can speak while watching the image.

Referring to FIG. 10 (*b*), the terminal device 100 having the volume turned up is illustrated. The terminal device 100 recognizes a voice and is able to adjust the volume in accordance with the recognized voice. For instance, the terminal device 100 can adjust the volume by recognizing the voice (e.g., 'volume up') related to the volume adjustment. If the terminal device 100 recognizes the voice related to 'volume up', the terminal device 100 can raise the volume bar 15.

Referring to FIG. 10 (*c*), the terminal device 100 having the volume turned down is illustrated. The terminal device 100 can adjust the volume by recognizing the voice (e.g., 'volume down') related to the volume adjustment. If the terminal device 100 recognizes the voice related to 'volume down', the terminal device 100 can lower the volume bar 15.

FIG. 11 is a diagram to describe one embodiment of outputting a voice matched to an object in a photo.

Referring to FIG. 11 (*a*), a terminal device 100 currently outputting a background sound together with an image is illustrated. As mentioned in the foregoing description, the terminal device 100 can save a captured image in a manner of linking the captured image to a background sound. The terminal device 100 can determine whether a voice contained in the background sound is a voice related to a photographer. The terminal device 100 determines an object contained in the image and is then able to match the voice contained in the background sound to the determined object.

A user can enlarge a part of a $1^{st}$ object 4 contained in the image by listening to the background sound.

Referring to FIG. 11 (*b*), the terminal device 100 currently outputting a voice part of the $1^{st}$ object 4 is illustrated. The terminal device 100 can match the $1^{st}$ object and the voice to each other. In response to a user's gesture, the terminal device 100 can determine that the part of the $1^{st}$ object 4 is enlarged. The terminal device 100 can play the background sound in a manner of jumping to the voice part matched to the $1^{st}$ object 4 in the background sound. FIG. 11(*b*) shows that the voice part of the $1^{st}$ object 4 is illustrated as displayed on the screen. Optionally, the terminal device 100 may output the voice part of the $1^{st}$ object 4 as a sound through an audio output unit. In particular, when the terminal device 100 displays the image having the background sound linked thereto, if the $1^{st}$ object 4 contained in the image is enlarged, the terminal device 100 can play the background sound in a manner of jumping to a part containing a $1^{st}$ voice linked to the $1^{st}$ object 4 in the background sound. If the play of the voice part of the $1^{st}$ object 4 is ended, the terminal device 100 may reduce the image automatically.

Besides, if the terminal device 100 is in silence mode, as shown in FIG. 11 (*b*), the terminal device 100 can output the voice part of the $1^{st}$ object 4 as a text to the screen [described later in the present specification].

Figure 12:
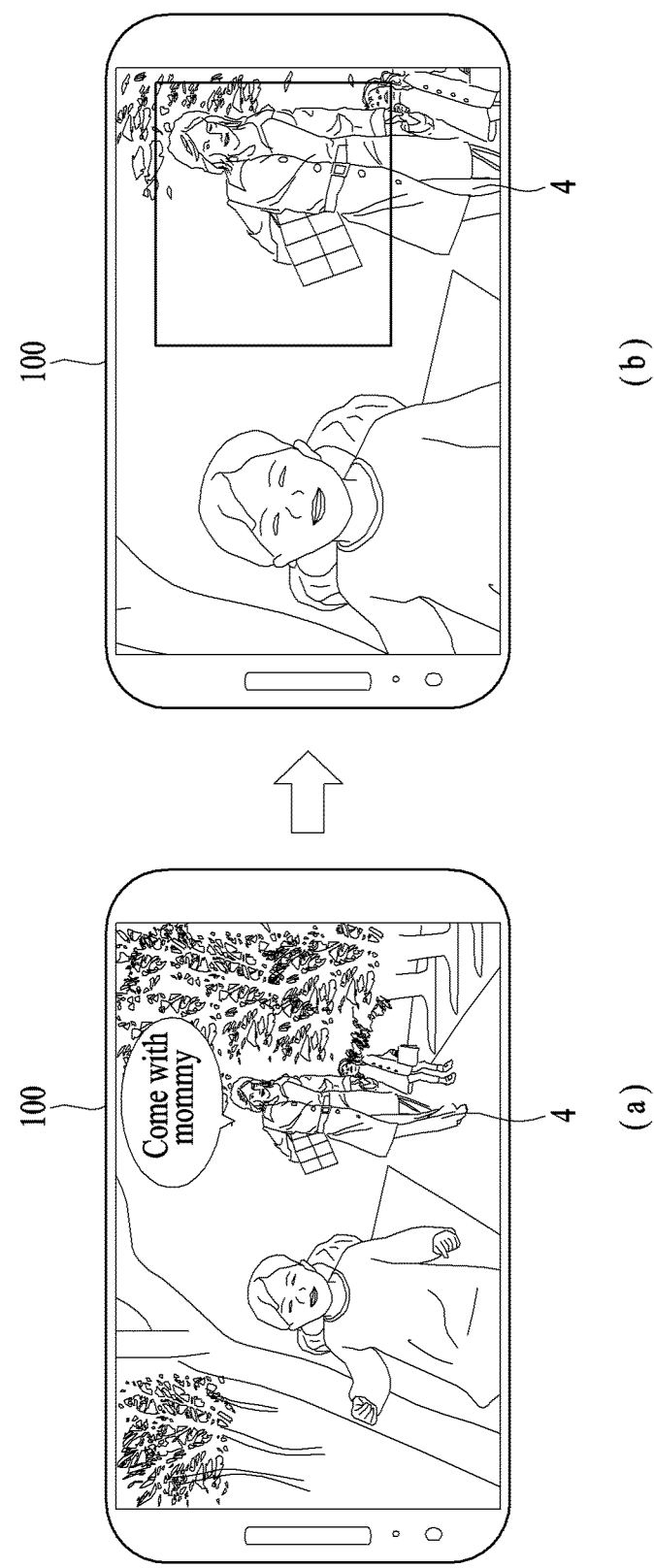
FIG. 12 is a diagram to describe one embodiment of displaying an object in a photo matched to a voice.

FIG. 12 is a diagram to describe one embodiment of displaying an object in a photo matched to a voice.

Referring to FIG. 12 (a), a terminal device 100 currently outputting a background sound together with an image is illustrated. The terminal device 100 determines an object contained in the image and is able to match the object to a voice in the background sound. While the terminal device 100 plays the background sound, the terminal device 100 may detect a voice part of a $1^{st}$ object 4.

Referring to FIG. 12 (b), the terminal device 100 currently outputting the voice part of the $1^{st}$ object 4 is illustrated. The terminal device 100 can match the $1^{st}$ object 4 to a voice. If the terminal device 100 detects the voice part of the $1^{st}$ object 4 in the background sound, the terminal device 100 can enlarge a part of the $1^{st}$ object 4. While playing the voice matched to the $1^{st}$ object 4, the terminal device 100 enlarges the part of the $1^{st}$ object 4. If the voice play of the $1^{st}$ object 4 is ended, the terminal device 100 can reduce the image to return to an original image. In particular, when the terminal device 100 displays an image having a background sound linked thereto, if a part containing a $1^{st}$ voice included in the background sound is played, the terminal device 100 can enlarge a $1^{st}$ object linked to the $1^{st}$ voice in the background sound linked image.

Although FIG. 12 shows that the voice part of the $1^{st}$ object 4 is illustrated as displayed on the screen, the terminal device 100 may output the voice part of the $1^{st}$ object 4 as a sound through an audio output unit. If the terminal device 100 is in silence mode, as shown in FIG. 12 (b), the terminal device 100 can output the voice part of the $1^{st}$ object 4 as a text to the screen.

Figure 13:
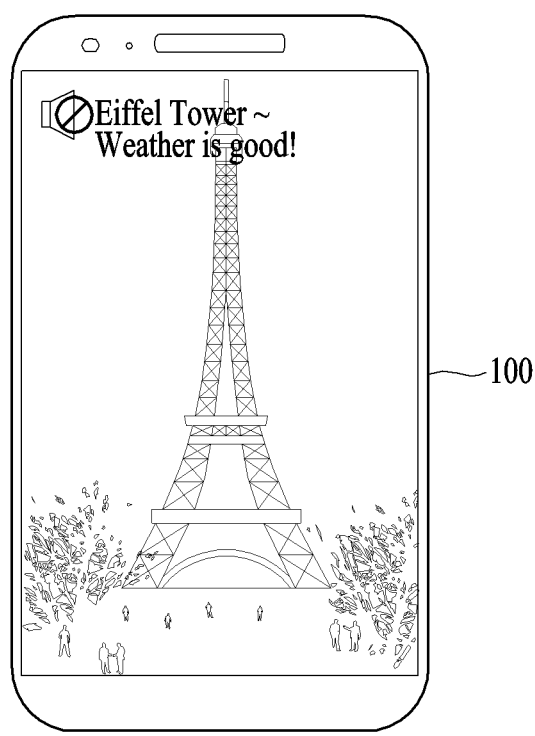
FIG. 13 is a diagram to describe one embodiment of outputting a sound content as a text.

FIG. 13 is a diagram to describe one embodiment of outputting a sound content as a text.

Referring to FIG. 13, in general, a terminal device 100 outputs an image and is also able to output a background sound linked to the image. Yet, the terminal device 100 may be in vibration mode or silence mode. In doing so, the terminal device 100 may output the background sound as a text. And, the terminal device 100 may output a voice of a person as a text. Moreover, the terminal device 100 may output an animal sound or an ambient sound as a representative onomatopoeia. For instance, if the background sound contains a crying sound of a cat, the terminal device 100 can display a text 'miaow'. If the background sound contains a bus horn sound, the terminal device 100 can display a text 'beep beep'. If a voice contained in the background sound is long, the terminal device 100 may display a primary keyword only. In particular, if a background sound linked image is selected in vibration or silence mode, the terminal device 100 does not output the background sound by is able to display a text of the voice contained in the background sound.

Figure 14:
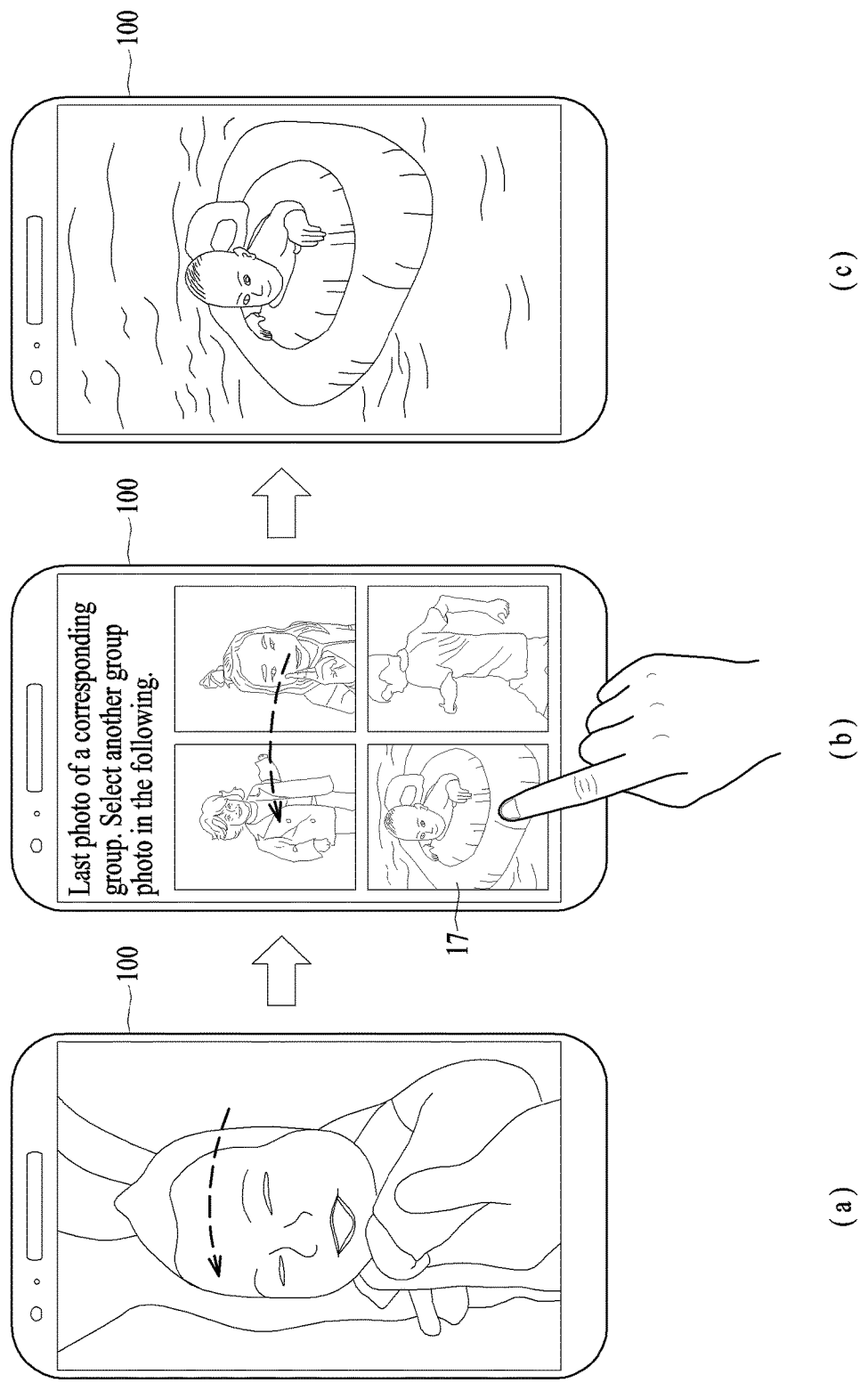
FIG. 14 is a diagram to describe one embodiment of recommending a different group related to an object in one group.

FIG. 14 is a diagram to describe one embodiment of recommending a different group related to an object in one group.

Referring to FIG. 14 (a), a terminal device 100 currently displaying an image is illustrated. The displayed image is a last one of a plurality of images managed as a single group. The terminal device 100 can manage a plurality of images, which are related to one another temporally and spatially, as a single group. Hence, the terminal device 100 can link a plurality of the images included in the single group to a single background video or a single background sound. When the terminal device 100 displays an image included in the single group having the background sound linked thereto, the terminal device 100 can play the same background sound until the last image is displayed. A user may apply a flicking by watching the last one of a plurality of the images included in the single group.

Referring to FIG. 14 (b), the terminal device 100 currently recommending other groups containing the same object is illustrated. The terminal device 100 displays the last image in the single group. If the last image is flicked, the terminal device 100 can output a page for selecting other groups containing the same object. For instance, as shown in FIG. 14, if a user watches a $1^{st}$ group photo containing a baby 'a', the terminal device 100 can display the page for selecting other groups containing the baby 'a'. In particular, if the terminal device 100 displays the last image included in the single group, the terminal device 100 can display a menu for selecting at least one different group that contains the object contained in a plurality of images belonging to the single group in common.

If the user flicks the group selection page, the terminal device 100 can display an image located next to the $1^{st}$ group. In this case, the image located next to the $1^{st}$ group may include a normal image that does not contain a background sound or a background video. The image located next to the $1^{st}$ group may include a different group image containing a different object. The user may select a $2^{nd}$ group 17 from the group selection page.

Referring to FIG. 14 (c), the terminal device 100 currently displaying a $2^{nd}$ group image is illustrated. If the user selects the $2^{nd}$ group 17, the terminal device 100 can display an image included in the $2^{nd}$ group. If the user flicks the displayed image, the terminal device 100 can display a next image in the $2^{nd}$ group in response to a user's gesture. The terminal device 100 displays a $2^{nd}$ image and is able to output a linked background sound.

Figure 15:
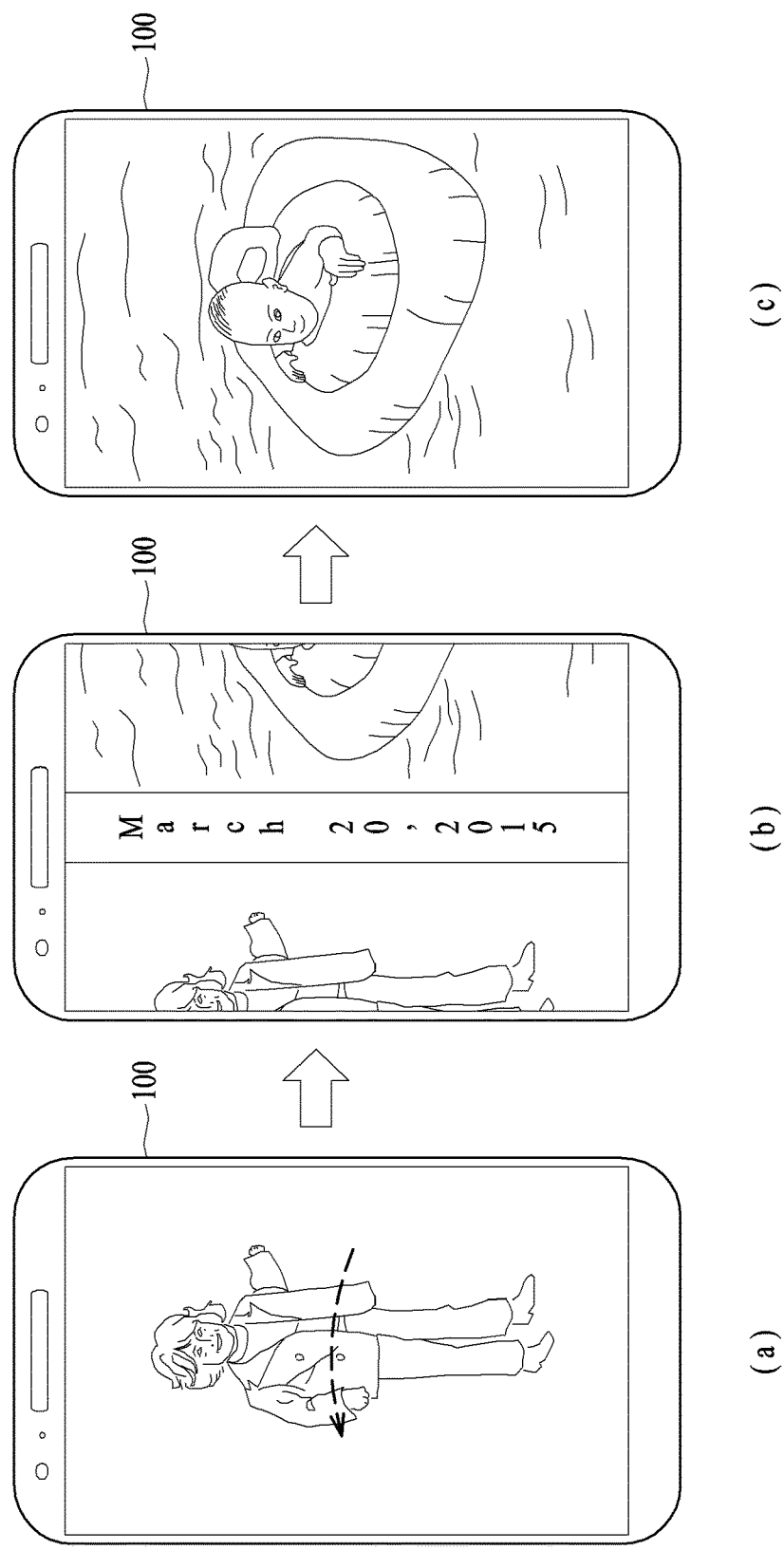
FIG. 15 is a diagram to describe one embodiment of connecting a different group related to an object in one group.

FIG. 15 is a diagram to describe one embodiment of connecting a different group related to an object in one group.

Referring to FIG. 15 (a), a terminal device 100 currently displaying an image is illustrated. The terminal device 100 can manage a plurality of images, which are related to one another temporally and spatially, as a single group. And, the displayed image may include a last one of a plurality of the images managed as the single group. A user may apply a flicking by watching the last one of a plurality of the images included in the single group.

Referring to FIG. 15 (b), the terminal device 100 currently displaying a photo of a different group containing the same object is illustrated. As mentioned in the foregoing description, a plurality of photos managed as a single group may be linked to a background sound. The terminal device 100 can recognize an inputted voice. If a voice of the object contained in the background sound is recognized as identical to the inputted voice, the terminal device 100 can consecutively display photos of the different group containing the same object in an image. The terminal device 100 may consecutively display photos of a group photographed in the same space of the displayed single group or at a time adjacent to that of the displayed single group. In this case, the adjacent time may be set in accordance with a user. For instance, the same date can be set as the adjacent time. For another instance, the same month can be set as the adjacent time. When the terminal device 100 displays an image of a different group consecutively, the terminal device 100 can insert information indicating when a corresponding photo was taken.

Referring to FIG. 15 (c), the terminal device 100 currently displaying an image of a different group is illustrated. In response to a user's flicking gesture, the terminal device 100 can display a photo of the different group.

If the terminal device 100 displays a photography date information for switching to a different group, as shown in FIG. 15 (b), the user may not have completed the flicking gesture yet. The terminal device 100 can display a last image of a previous group again. If the user turns the last page of the previous group with a flicking gesture again, the terminal device 100 can display a general image. In particular, while an image of a $1^{st}$ group is displayed, when the terminal device 100 attempts to switch to a $2^{nd}$ group, if the switching to the $2^{nd}$ group is not complete, the terminal device 100 can display the general image located behind the $1^{st}$ group. When a photography date information of the $2^{nd}$ group is displayed, as shown in FIG. 15 (b), the terminal device 100 is able to hold a flicking gesture. Hence, the terminal device 100 can maintain the screen shown in FIG. 15 (b) in response to the holding of the flicking gesture. If the screen of displaying the photography date information of the $2^{nd}$ group is maintained for a predetermined time, as shown in FIG. 15 (b), the terminal device 100 may determine that the user does not desire the switching to the $2^{nd}$ group. Hence, the terminal device 100 does not switch to the $2^{nd}$ group but is able to display the general image located behind the $1^{st}$ group.

Figure 16:
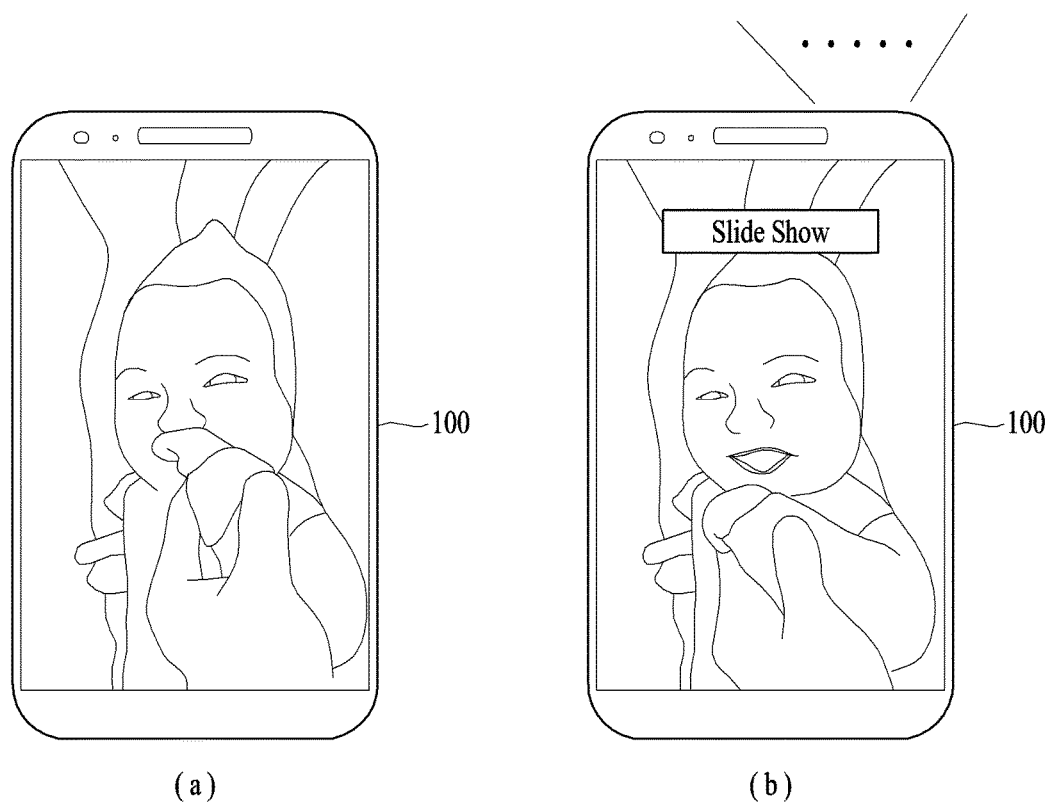
FIG. 16 is a diagram to describe a process for running a slide show according to one embodiment of the present invention.

FIG. 16 is a diagram to describe a process for running a slide show according to one embodiment of the present invention.

Referring to FIG. 16 (a), a terminal device 100 currently displaying an image included in a single group is illustrated. A user can watch the displayed image over a predetermined time. After the user has watched the displayed image over the predetermined time, the user can input a flicking gesture.

Referring to FIG. 16 (b), the terminal device 100 currently running a slide show is illustrated. The terminal device 100 holds to display an image included in a single group over a predetermined time in response to a user's gesture and is then able to switch to a next image. In doing so, the terminal device 100 can play a plurality of images included in the single group through a slide show. The terminal device 100 can output a linked background sound together. In particular, the terminal device 100 displays one of a plurality of the images. If the displayed image is held over the predetermined time, the terminal device 100 can play a plurality of the images through the slide show. In this case, the preset time may vary depending on a user's setting. For instance, the preset time may be set to 3 or 5 seconds.

Figure 17:
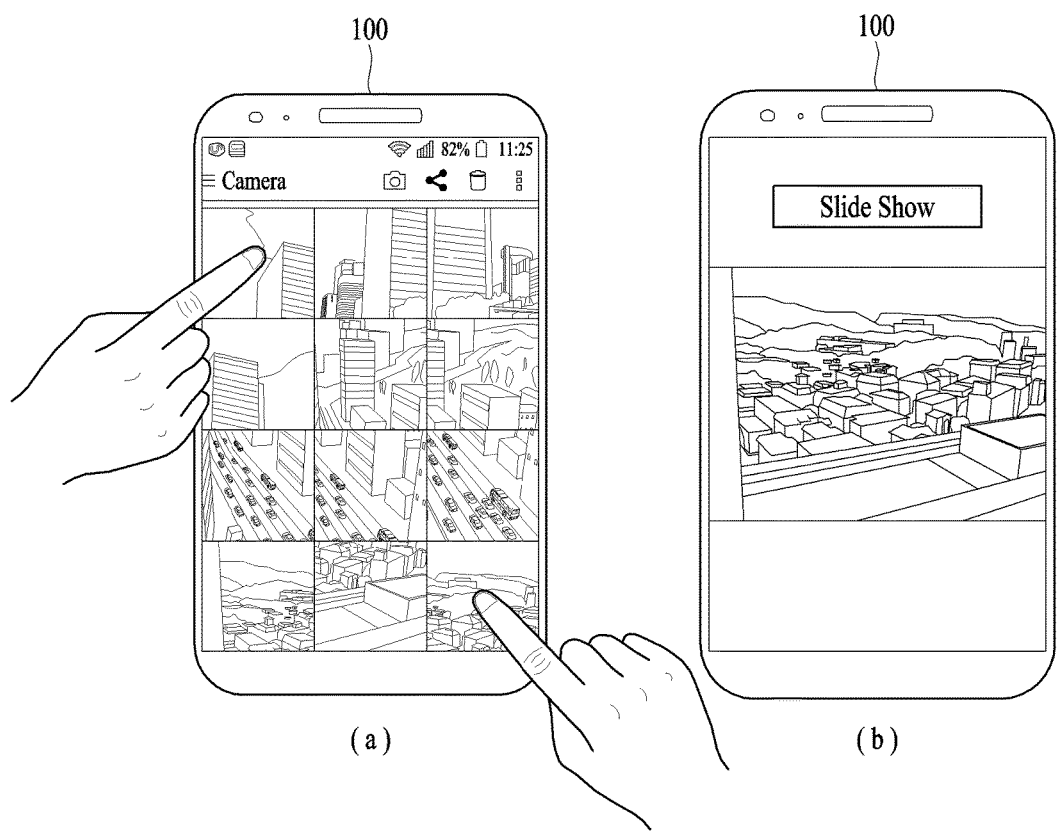
FIG. 17 is a diagram to describe a process for running a slide show according to another embodiment of the present invention.

FIG. 17 is a diagram to describe a process for running a slide show according to another embodiment of the present invention.

Referring to FIG. 17 (a), a terminal device 100 currently displaying thumbnail images is illustrated. The terminal device 100 can display the taken photos as thumbnails. If one image is selected from the thumbnails images, the terminal device 100 can display the selected image as a full screen. The terminal device 100 can manage a plurality of images associated with one another temporally and spatially as a single group. In particular, the terminal device 100 can configure a plurality of images containing a $2^{nd}$ image and an image captured after the $2^{nd}$ image into a single group. The terminal device 100 can display a plurality of the images configuring the single group in a manner that the corresponding images are adjacent to each other. In some cases, the terminal device 100 may provide the thumbnail with the image included in the single group in a manner that the image is outlined in the same color. A user can select two images from the images included in the single group.

Referring to FIG. 17 (b), the terminal device 100 currently running a slide show is illustrated. If two images are selected from the images included in the single group, the terminal device 100 can set the selected two images to a start image and an end image, respectively. And, the terminal device 100 can run the slide show configured with the two images and an image located between the two images.

Figure 18:
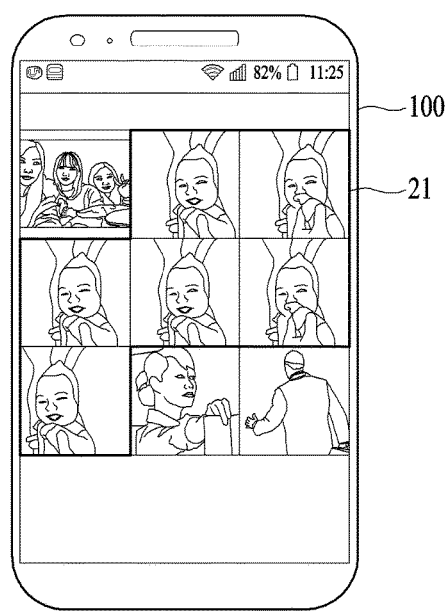
FIG. 18 is a diagram of a gallery screen according to one embodiment of the present invention.

FIG. 18 is a diagram of a gallery screen according to one embodiment of the present invention.

Referring to FIG. 18, when a captured image is displayed as a thumbnail, the terminal device 100 can adjacently dispose a plurality of images managed as a single group. The terminal device 100 can mark an outline 21 on a plurality of the images managed as the single group in order to distinguish the managed images from other images. For instance, the terminal device 100 can distinguish the images included in the single group from other images in a manner of differentiating the images included in the single group in at least one of boldness, color, shape and the like of the outline 21. When the terminal device 100 displays the captured images one by one, the terminal device 100 can adjacently display a plurality of the images managed as the single group.

Figure 19:
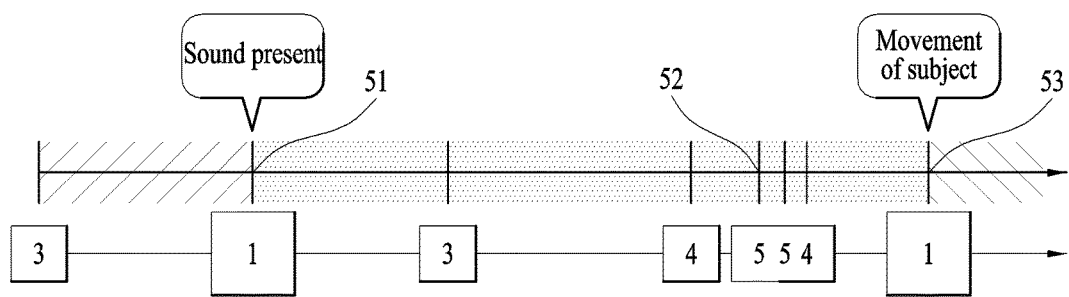
FIG. 19 is a diagram to describe a method of adjusting a speed of a slide show according to one embodiment of the present invention.

FIG. 19 is a diagram to describe a method of adjusting a speed of a slide show according to one embodiment of the present invention.

Referring to FIG. 19, a terminal device 100 can adjust a progress speed in running a slide show. According to one embodiment, the progress speed of the slide show can be set to one of 1 to 5. The numeral of the progress speed may mean a relative speed. For instance, the progress speed set to 5 may be 5 times faster than the progress speed set to 1.

The progress speed of the slide show may be set in a manner as follows. First of all, among a plurality of images included in a slide show, there may exist an image containing a sound (or a voice) and an image failing to contain a sound (or a voice). When the terminal device 100 displays an image 51 containing a sound, the terminal device 100 can display the image 51 at the speed of 1. In particular, the terminal device 100 may display an image containing a sound for a relatively long time. And, the terminal device 100 may display an image failing to contain a sound for a relatively short time. The reason for this is that a user may possibly desire to watch the image 51 containing the sound more closely or to listen to the sound. Yet, the terminal device 100 displays an image failing to contain a sound for a relatively short time and may be then able to display a next image.

There may exist an image having a short shot interval with a next image and an image having a long shot interval with a next image. When the terminal device 100 displays an image 52 having a short shot interval, the terminal device 100 may display it at the speed of 5. In particular, the terminal device 100 may display an image having a long shot interval with a next image for a relatively long time. And, the terminal device 100 may display an image having a short shot interval with a next image for a relatively short time. Since the image 52 having the short shot interval may not have much change from a next image, it is highly possible that the image 52 having the short shot interval may be similar to the next image.

There may exist an image having a large movement of an object and an image having a small movement of an object. When the terminal device 100 displays an image 53 having a large movement of an object, the terminal device 100 can display the image 53 at the speed of 1. In particular, the terminal device 100 may display an image having a large movement of an object for a relatively long time. And, the terminal device 100 may display an image having a small movement of an object for a relatively short time. If a movement of an object is large, a user may possibly desire to watch the image 53 more closely.

In particular, the terminal device 100 can adjust a play time interval of a slide show in consideration of at least one of a presence or non-presence of a sound, a presence or non-presence of an object movement equal to or greater than a preset rate, and shot intervals among a plurality of images.

Figure 20:
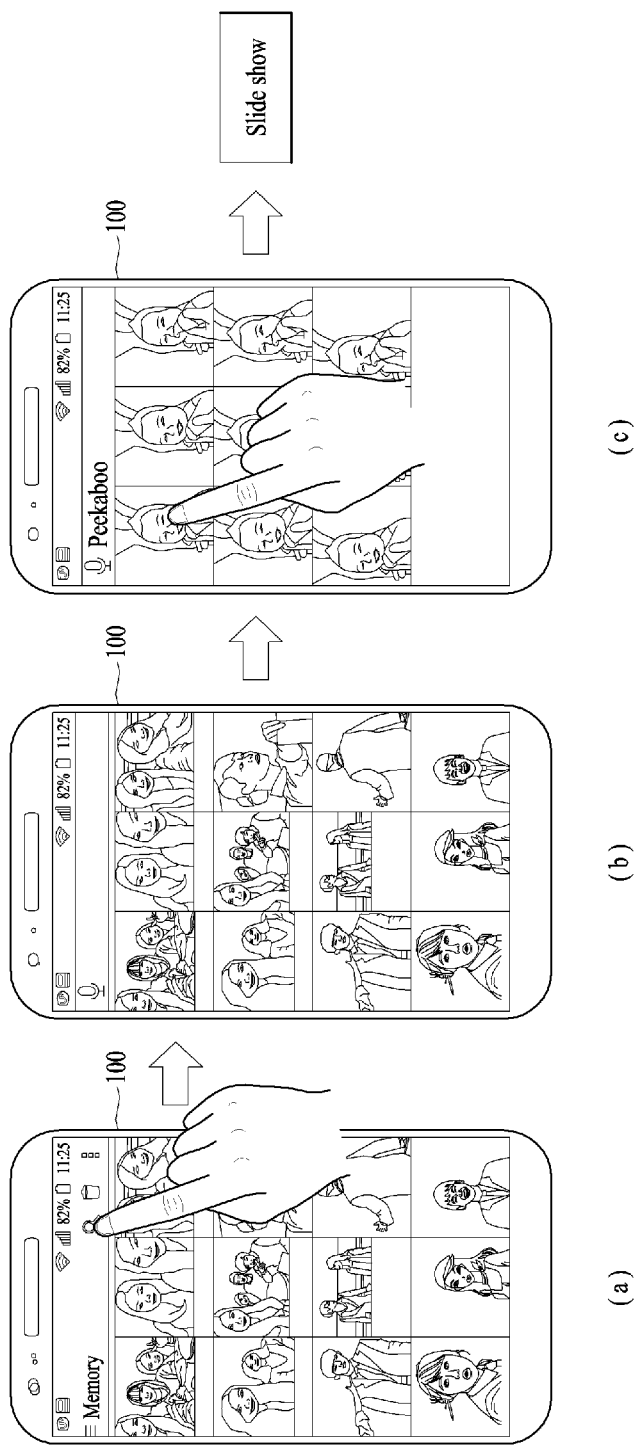
FIG. 20 is a diagram to describe a process for searching a group using a voice according to one embodiment of the present invention.

FIG. 20 is a diagram to describe a process for searching a group using a voice according to one embodiment of the present invention.

Referring to FIG. 20 (a), a terminal device 100 currently searching images with a voice is illustrated. An image containing a voice among images linked to a background sound can be found through a voice. If a user selects a voice search menu, the terminal device 100 can receive an input of a user's voice.

Referring to FIG. 20 (b), the terminal device 100 in the course of the voice search is illustrated. The user may input a specific word, an onomatopoeia or the like to the terminal device 100. The terminal device 100 can search for a voice that matches the specific word or onomatopoeia inputted with the voice by the user. The terminal device 100 is then able to search for images linked to the found voice.

Referring to FIG. 20 (c), the terminal device 100 currently displaying the images found with the voice is illustrated. The terminal device 100 can display the found images. The terminal device 100 can run a slide show containing the found images. The user may select prescribed images from the found images. And, the terminal device 100 can run the slide show containing the selected prescribed images.

Figure 21:
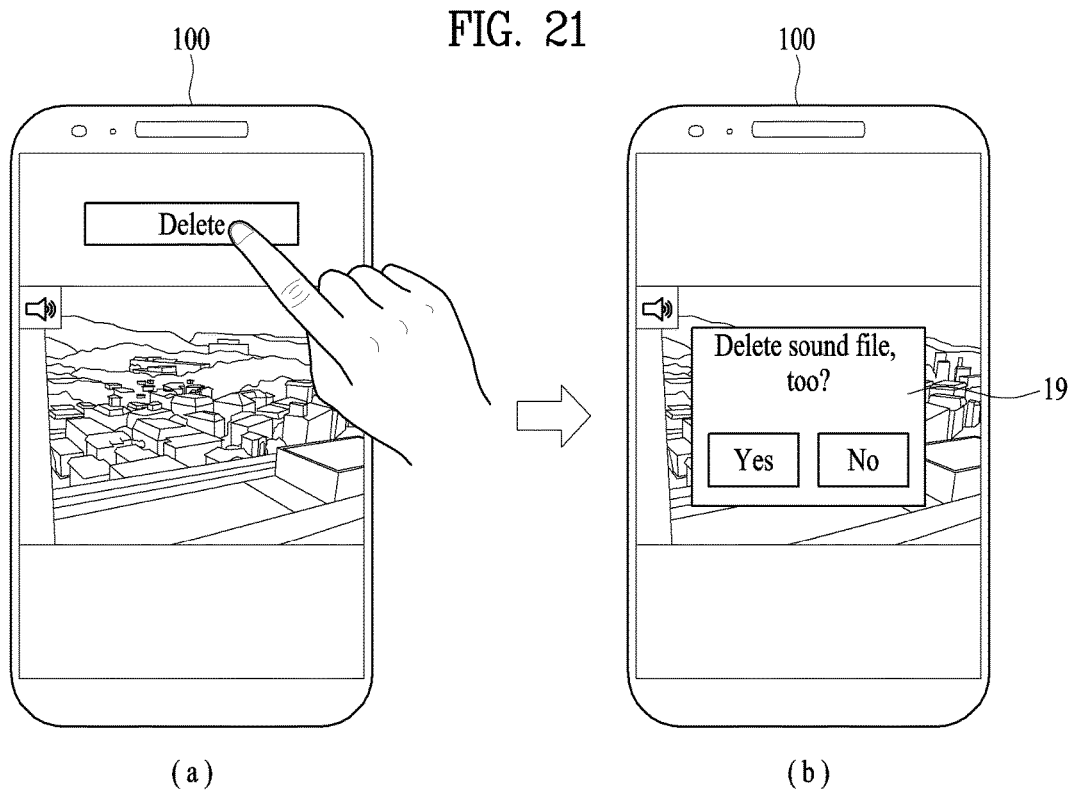
FIG. 21 is a diagram to describe one example of deleting a photo according to one embodiment of the present invention.

FIG. 21 is a diagram to describe one example of deleting a photo according to one embodiment of the present invention.

Referring to FIG. 21(a), a terminal device 100 currently deleting a photo included in a single group is illustrated. The terminal device 100 can delete a taken photo in response to a user's command.

Referring to FIG. 21 (b), the terminal device 100 currently querying whether to dele a background sound is illustrated. When a photo having a background sound or video linked thereto is deleted, the terminal device 100 can display a window 19 for querying whether to delete the background sound/video.

Meanwhile, whenever a photo is deleted, the terminal device 100 can query whether to delete a background sound/video. Optionally, when the terminal device 100 deletes first one or two photos, the terminal device 100 deletes the photo(s) without querying Whether to delete the background sound/video. After at least one half of photos included in a single group have been deleted, if a photo deletion command is inputted, the terminal device 100 may query whether to delete the background sound/video. Optionally, while the terminal device 100 deletes photos without querying whether to delete the background sound/video, if the terminal device 100 deletes a last photo included in a single group, the terminal device 100 can query whether to delete the background sound/video.

So far, various embodiments of the present invention are described. In the following description, a method of controlling a terminal device is described in detail with reference to a flowchart.

Figure 22:
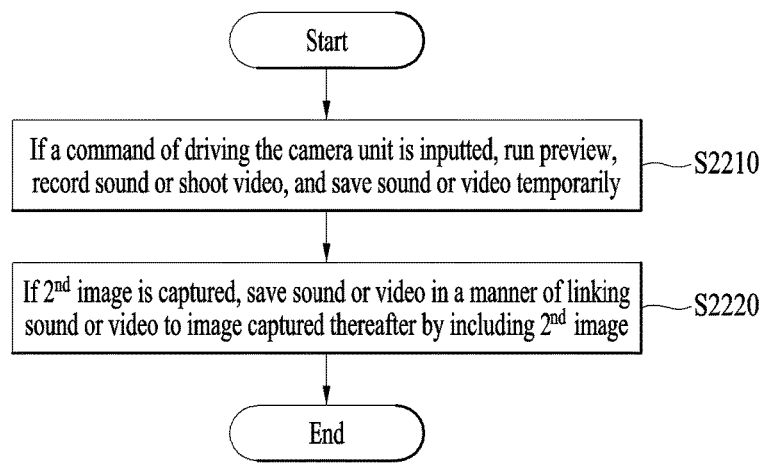
FIG. 22 is a flowchart for a method of controlling a terminal device according to one embodiment of the present invention.

FIG. 22 is a flowchart for a method of controlling a terminal device according to one embodiment of the present invention.

Referring to FIG. 22, if a command of driving the camera unit is inputted, a terminal device runs a preview, shoots a background video containing a background sound, and is able to save the background video temporarily [S2210]. The terminal device may shoot a background video before receiving an input of an image capturing command from a user and save the background video temporarily.

If a $2^{nd}$ image is captured, the terminal device can save the background sound or the background video in a manner of linking the background sound or the background video to images captured thereafter by including the $2^{nd}$ image [S2220]. If the terminal device captures the $2^{nd}$ image, the terminal device can save the temporarily saved background video or sound together with the $2^{nd}$ image in a manner of linking the temporarily saved background video or sound to the $2^{nd}$ image. In some cases, if the $2^{nd}$ image is captured in the course of shooting the background video, the terminal device can mark a timing point of capturing the $2^{nd}$ image in the background video with a bookmark. Subsequently, if a $3^{rd}$ image is captured, the terminal device can mark a timing point of capturing the $3^{rd}$ image with a bookmark. If the shooting is ended, the terminal device can save the captured images in a manner of linking the captured images to the background video or the background sound.

The above-described present invention can be implemented in a program recorded medium as computer-readable codes. The computer-readable media may include all kinds of recording devices in which data readable by a computer system are stored. The computer-readable media may include HDD (hard disk drive), SSD (solid state disk), SDD (silicon disk drive), ROM, RAM, CD-ROM, magnetic tapes, floppy discs, optical data storage devices, and the like for example and also include carrier-wave type implementations (e.g., transmission via Internet). Further, the computer may include the controller 180 of the terminal. It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
   a camera unit configured to capture a first image;
   a memory configured to store the captured first image;
   an output unit configured to display the captured first image; and
   a controller configured to control the camera unit, the memory and the output unit,
   wherein the controller is further configured to:
      in response to a command of driving the camera unit is being inputted, cause the camera unit to run a preview, record a sound and shoot a video, save temporarily the sound and the video,
      in response to a second image is being captured, cause the memory to store the sound and the video in a manner of linking the sound and the video to at least one of the first image and the second image,
      when an object appearing in a plurality of images, including the second image and a number of images captured thereafter, undergoes a change, selected from a group consisting of an object movement over a preset rate, an object addition and an object disappearance, cause the memory to store the plurality of images in a manner of linking the plurality of images to the video, configure the plurality of images including the second image and at least one images captured thereafter into a single group, in response to one of the plurality of images is being displayed and the displayed image is being maintained over a preset time, play the plurality of images as a slide show, and in response to a last image in the single group is being displayed, cause the output unit to display a menu for selecting at least one different group of images from the plurality of images included in the single group, wherein each of the images in the different group include a common object.

2. The mobile terminal of claim 1, wherein when the object appearing in the plurality of images, including the second image and the number of images captured thereafter, does not undergo the change, the controller is further configured to cause the memory to store the plurality of images in a manner of linking the plurality of images to the sound.

3. The mobile terminal of claim 1, wherein when an object in the captured first image changes relative to the object in a previously captured first image, the controller is further configured to:

stop the recording of the sound and the shooting of the video, record a new sound and shoots a new video, and temporarily store the new sound and the new video in the memory.

4. The mobile terminal of claim 1, wherein the controller is further configured to remove noise from the sound.

5. The mobile terminal of claim 1, wherein the controller is further configured to remove a voice from the sound when the voice fails to match call voice data of a user of a terminal device.

6. The mobile terminal of claim 1, wherein when a video linked image is selected, the controller is further configured to cause the output unit to display a button for playing the video together with the video linked image.

7. The mobile terminal of claim 1, wherein when a sound linked image is selected, the controller is further configured to:

display the sound linked image, and play the sound.

8. The mobile terminal of claim 7, wherein the controller is further configured to adjust a volume of the sound by recognizing a user's voice.

9. The mobile terminal of claim 1, wherein if a sound linked image is selected in a vibration mode, the controller is further configured to display a text of voice contained in the sound without outputting the sound.

10. The mobile terminal of claim 1, wherein the controller is further configured to adjust a play time interval of the slide show based on at least one selected from the group consisting of a presence or non-presence of the sound, a presence or non-presence of an object movement over a preset rate, and shot intervals among the plurality of the images.

11. The mobile terminal of claim 1, wherein when a last image in the single group is displayed, the controller controls the output unit to display a menu for selecting at least one different group of images from the plurality of images included in the single group, and wherein each of the images in the different group include a common object.

12. The mobile terminal of claim 1, wherein when the plurality of images of the single group are displayed as thumbnails and a start image and an end image are selected from the plurality of images, the controller is further configured to cause the output unit to display a slide show including the start image and the end image and any images there between.

13. The mobile terminal of claim 1, wherein when the sound or video linked image is deleted, the controller is further configured to cause the output unit to display a menu for deleting the sound or video linked to the deleted image.

14. The mobile terminal of claim 1, wherein the controller is further configured to cause the memory to store the sound in a manner of linking the sound to the first image captured thereafter by including the second image.

15. The mobile terminal of claim 1, wherein the controller is further configured to cause the memory to store the video in a manner of linking the video to the first image captured thereafter by including the second image.

16. A method of controlling a terminal device comprising the steps of:

when a command of capturing image inputted, running a preview, recording a sound and shooting a video and temporarily saving the sound and the video;

capturing a first image;

in response to a second image is being captured, saving the sound and the video in a manner of linking the sound and the video to at least one of the first image and the second image;

when an object appearing in a plurality of images, including the second image and a number of images captured thereafter, undergoes a change, selected from a group consisting of an object movement over a preset rate, an object addition and an object disappearance, causing the memory to store the plurality of images in a manner of linking the plurality of images to the video;

configuring the plurality of images including the second image and at least one images captured thereafter into a single group;

in response to one of the plurality of images is being displayed and the displayed image is being maintained over a preset time, playing the plurality of images as a slide show, and in response to a last image in the single group is being displayed, causing an output unit to display a menu for selecting at least one different group of images from the plurality of images included in the single group, wherein each of the images in the different group include a common object.

* * * * *